United States Patent
Payzer et al.

(10) Patent No.: US 11,014,011 B2
(45) Date of Patent: May 25, 2021

(54) CROSS-PLATFORM INTERACTIVE STREAMING

(71) Applicant: Microsoft Technology Licensing, LLC, Redmond, WA (US)

(72) Inventors: Gershom L. Payzer, Redmond, WA (US); Richard Michael Fox, Berlin (DE); Gregory M. Smith, Seattle, WA (US); Connor Peet, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 596 days.

(21) Appl. No.: 15/865,711

(22) Filed: Jan. 9, 2018

(65) Prior Publication Data

US 2019/0118099 A1   Apr. 25, 2019

Related U.S. Application Data

(60) Provisional application No. 62/575,066, filed on Oct. 20, 2017.

(51) Int. Cl.
| | |
|---|---|
| *A63F 13/86* | (2014.01) |
| *H04L 29/08* | (2006.01) |
| *H04L 29/06* | (2006.01) |
| *A63F 13/352* | (2014.01) |
| *H04N 21/2187* | (2011.01) |

(52) U.S. Cl.
CPC ............ *A63F 13/86* (2014.09); *A63F 13/352* (2014.09); *H04L 65/1089* (2013.01);
(Continued)

(58) Field of Classification Search
CPC .... A63F 13/86; A63F 13/352; H04L 65/1089; H04L 65/4015; H04L 65/4076; H04L 65/025
See application file for complete search history.

(56) References Cited

U.S. PATENT DOCUMENTS

| | | |
|---|---|---|
| 6,752,720 B1 | 6/2004 | Clapper et al. |
| 9,345,061 B1 | 5/2016 | Evans |

(Continued)

FOREIGN PATENT DOCUMENTS

| | | |
|---|---|---|
| WO | 2009073801 A1 | 6/2009 |
| WO | 2009076172 A2 | 6/2009 |

OTHER PUBLICATIONS

"Interactive 2 Protocol Specification", Retrieved From: «https://dev.mixer.com/reference/interactive/protocol/protocol.pdf», Retrieved on: Nov. 24, 2017, pp. 1-49.

(Continued)

*Primary Examiner* — William H McCulloch, Jr.
*Assistant Examiner* — Ankit B Doshi
(74) *Attorney, Agent, or Firm* — Alleman Hall Creasman & Tuttle LLP

(57) ABSTRACT

A method comprises electronically communicating with a game program executing on a broadcaster computer configured to stream a broadcast of the game program, the game program supporting a set of game program methods and not a set of viewer program methods. The method further comprises electronically communicating with a viewer program executing on an audience computer configured to remotely present the broadcast, the viewer program supporting the set of viewer program methods and not the set of game program methods. The method further comprises receiving, from the viewer program, an indication of an invoked viewer program method. The method further comprises translating the indication into a corresponding indication of a game program method, and electronically communicating the indication of the game program method to the game program to effectuate output of the game program corresponding to the indicated game program method.

19 Claims, 11 Drawing Sheets

(52) U.S. Cl.
CPC ...... *H04L 65/4015* (2013.01); *H04L 65/4076* (2013.01); *H04L 67/025* (2013.01); *H04L 67/2823* (2013.01); *H04N 21/2187* (2013.01); *A63F 2300/577* (2013.01)

(56) References Cited

U.S. PATENT DOCUMENTS

| | | | |
|---|---|---|---|
| 9,424,052 | B2 | 8/2016 | Overton et al. |
| 9,573,057 | B2 | 2/2017 | Vange |
| 2007/0099704 | A1 | 5/2007 | Liu et al. |
| 2017/0001112 | A1 | 1/2017 | Gilmore et al. |
| 2017/0087460 | A1* | 3/2017 | Perry ................ A63F 13/35 |

OTHER PUBLICATIONS

"Interactive Reference Documentation", Retrieved From: «https://dev.mixer.com/reference/interactive/index.html», Retrieved on: Nov. 24, 2017, 21 Pages.

"Mixer—Interactive Livestreaming", Retrieved From: «https://mixer.com/?sandbox=xdks.1», Retrieved on: Nov. 24, 2017, 1 Page.

"Performance—interactive-cpp", Retrieved From: «https://github.com/mixer/interactive-cpp/wiki/Performance», Retrieved on: Nov. 24, 2017, 2 Pages.

"Performance—interactive-unity-plugin", Retrieved From: «https://github.com/mixer/interactive-unity-plugin/wiki/Performance», Retrieved on: Nov. 24, 2017, 2 Pages.

Thomas, Dallas, "Fully Control Your Android Device from Any Computer", Retrieved From: «https://android.gadgethacks.com/how-to/fully-control-your-android-device-from-any-computer-0164097/», Aug. 24, 2016, 23 Pages.

Thomas, Dallas, "Mirror & Control Your Android's Screen on Your Windows PC", Retrieved on: «https://android.gadgethacks.com/how-to/mirror-control-your-androids-screen-your-windows-pc-0175404/», Feb. 23, 2017, 14 Pages.

"International Search Report and Written Opinion Issued in PCT Application No. PCT/US2018/055755", dated Dec. 14, 2018, 12 Pages.

* cited by examiner

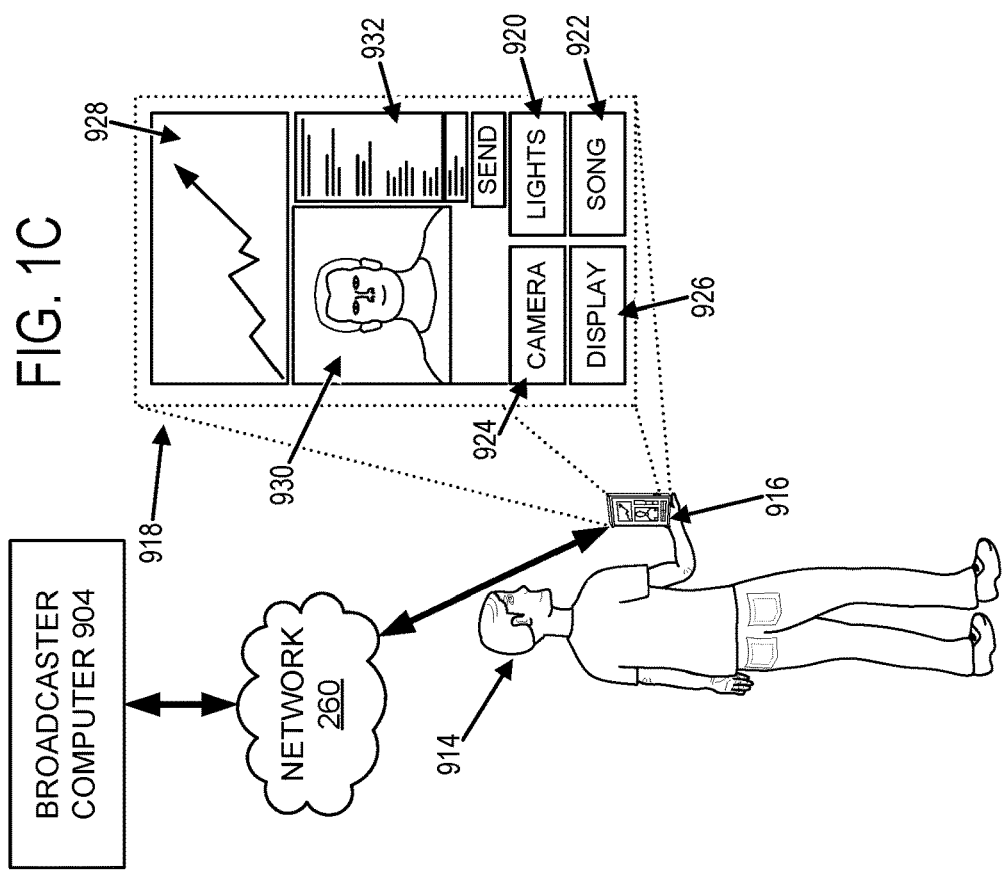
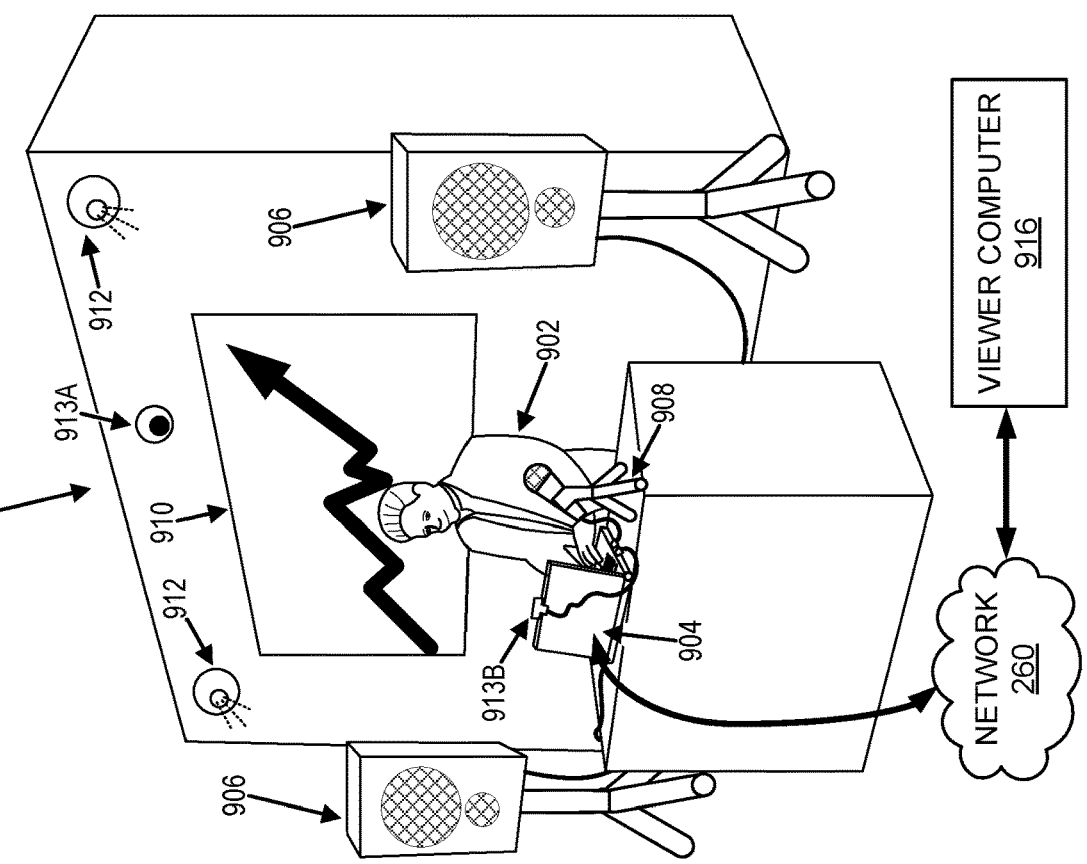

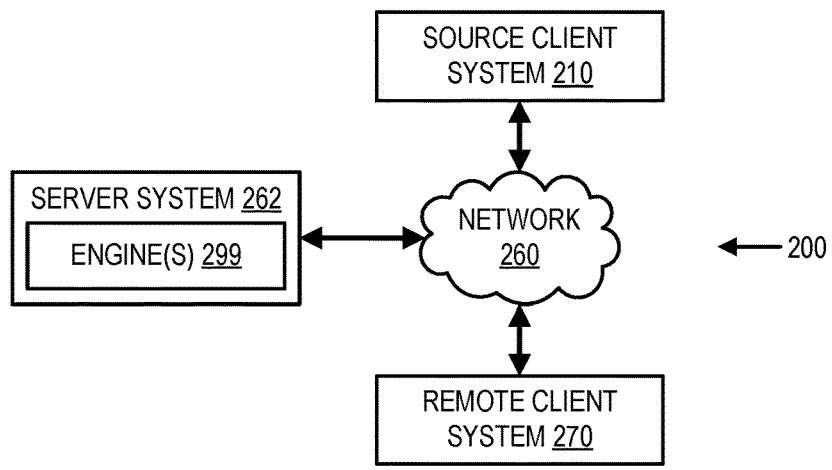
FIG. 2B
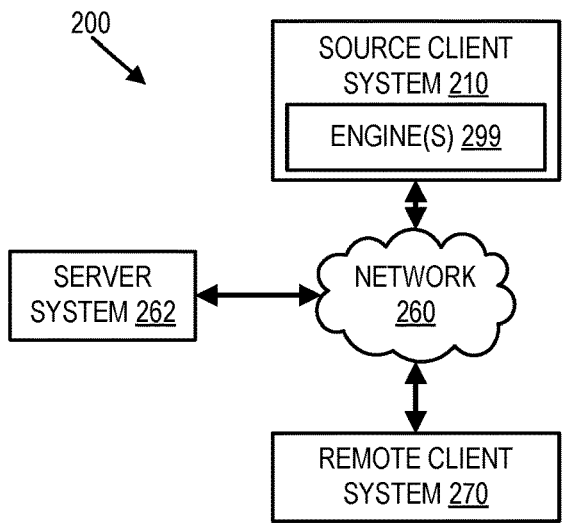
FIG. 2C
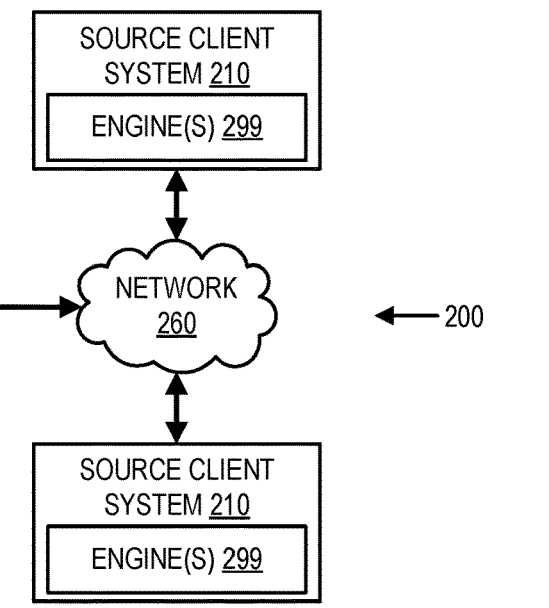
FIG. 2D
FIG. 2E

CROSS-PLATFORM INTERACTIVE STREAMING

CROSS REFERENCE TO RELATED APPLICATIONS

This application claims priority to U.S. Provisional Patent Application Ser. No. 62/575,066, filed Oct. 20, 2017, the entirety of which is hereby incorporated herein by reference for all purposes.

BACKGROUND

Audiovisual streaming allows a user to broadcast audiovisual content to an audience of viewers via information networks, such as the Internet. Any sort of audiovisual content may be broadcast by a user to an audience of viewers. For example, a user may stream gameplay of a video game, user-generated programming (e.g., live shows, podcasts), electronic sports (e-sports), and other events (e.g., panels, press conferences, and show floor activities).

BRIEF DESCRIPTION OF THE DRAWINGS

FIGS. 1A-1D depict example use-scenarios in which a broadcaster computer broadcasts an interactive experience to a remote device.

FIGS. 2A-2E schematically show respective implementations of an example computing environment in which a broadcaster computer provides audiovisual streaming in addition to interactive features.

DETAILED DESCRIPTION

Interactive audiovisual streaming allows a broadcaster and a plurality of viewers to participate in a shared experience. In exemplary scenarios, the broadcaster provides an audiovisual stream including content which may be of interest to the plurality of viewers, and sends the audiovisual stream over a network to viewing devices of the plurality of viewers. As examples, the audiovisual stream may include gameplay of one or more players playing a video game; live audio and video of a live commentator, moderator, and/or performer; or an electronic sports (e-sports) stream including gameplay of one or more players playing a competitive, multiplayer video game, optionally in conjunction with live audio and video of a live commentator of the multiplayer video game.

Beyond mere observation and communication with the broadcaster, greater levels of viewer interaction may be desired. As an example, a developer of a video game may wish to enable viewer input to affect the video game and the broadcaster's experience. However, implementing a streaming platform capable of supporting viewer participation beyond observation may be difficult for a video game developer. An increased technical burden may arise from an inability to rely on various assumptions associated with traditional multiplayer video game platforms. Unlike as in a traditional multiplayer environment, the hardware used by broadcasters and viewers may differ significantly in capability and/or configuration. Further, software configurations may differ significantly between broadcaster and viewer devices. For example, a viewer may participate in a stream via an Internet browser, whereas a broadcaster may play a video game that executes a proprietary video game engine. Similar issues may arise when attempting to implement an interactive streaming platform for other types of content, such as e-sports or other live events (e.g., conventions, concerts and other live performances).

Accordingly, examples are described herein that enable viewer participation in a streamed interactive experience across devices with differing hardware, software, and input modalities. As described below, aspects of the examples described herein may be implemented as a platform usable by developers of streamed interactive experiences, relieving developers of the burden of developing the platform themselves. Further, as also described below, the examples described herein may enable artists and other entities who lack the technical expertise associated with a typical programmer to design front-end, web-based functionality enabling viewer participation in streamed interactive experiences.

Figure 1A:
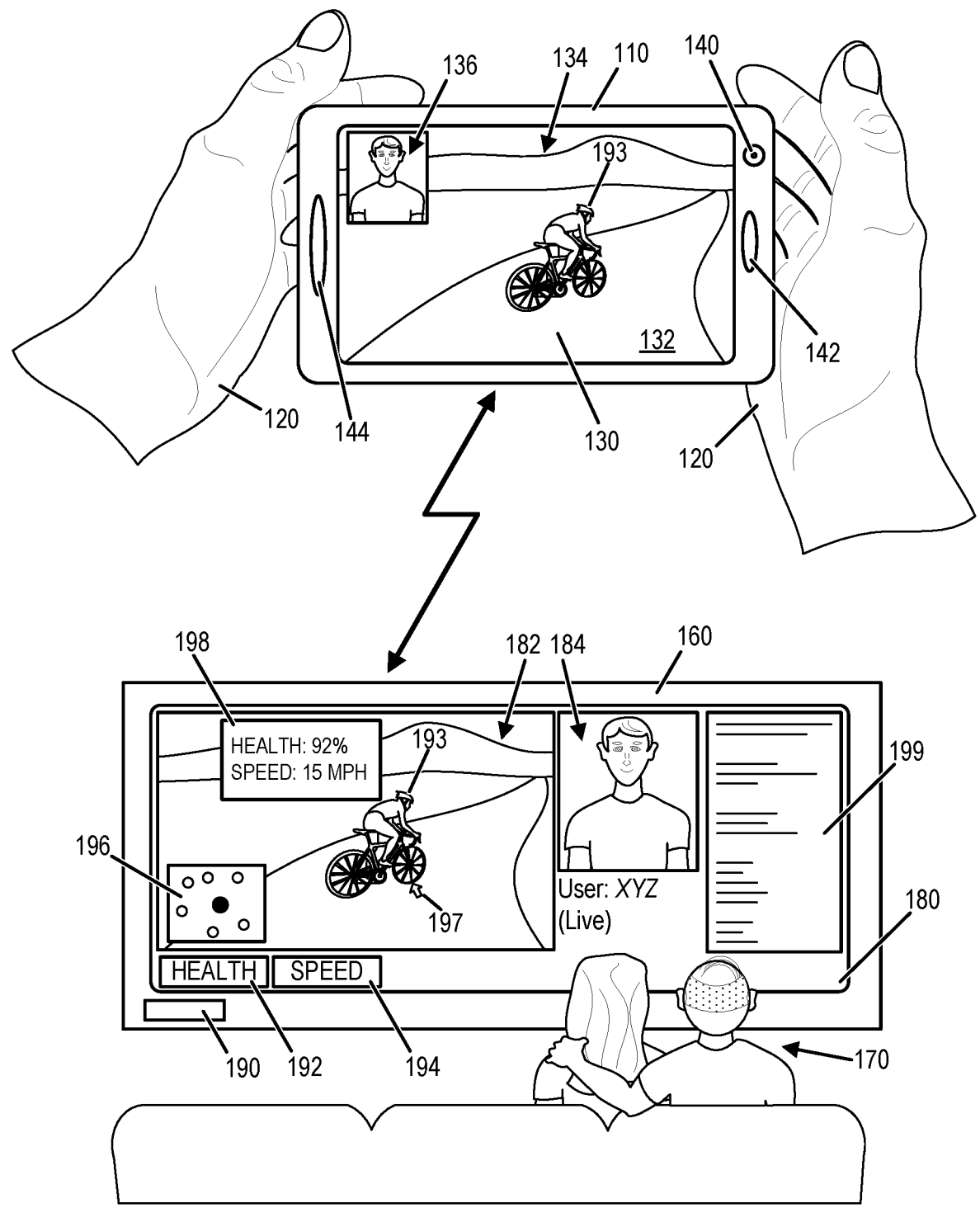

FIG. 1A depicts an example use-scenario in which a broadcaster computer 110 streams video game audio and video with game player audio and video to a remote device 160. In this example, broadcaster computer 110, operated by a user 120, includes a graphical display device 130 that is presenting a graphical user interface (GUI) 132. GUI 132 may include one or more interfaces that form components of the GUI. Broadcaster computer 110 may be a mobile computing device, as depicted in FIG. 1A, though streaming may be sent from other types of computing devices having different user input, processing and storage capabilities, as will be described below with reference to FIGS. 1B-1D.

For example, GUI 132 may include a game interface 134 for a game program (i.e., a video game) being played by user 120 at broadcaster computer 110. Game interface 134 may correspond to a game view presented during gameplay to user 120 as a game player of the game program. A visual representation of game interface 134 is streamed from broadcaster computer 110 to a remote device 160 for presentation via a graphical display device 180 to one or more remote viewers 170 as graphical content 182. Graphical content 182 may take the form of a video of game interface 134.

Broadcaster computer 110 may stream other visual content to remote device 160. For example, a visual representation of a camera view captured by a camera 140 of broadcaster computer 110 may be streamed to remote device 160 for presentation via graphical display device 180 to remote viewers 170 as graphical content 184. Graphical content 184 may take the form of a video of the camera view captured by camera 140. In this example, the camera view includes user 120, thereby enabling remote viewers 170 to see a visual representation of user 120 alongside a visual representation of the game interface 134. This visual representation of user 120 may be referred to as game player video within the context of user 120 being a game player of a game program.

Another interface component of GUI 132 at broadcaster computer 110 may include a camera view interface 136, which in this example includes the camera view captured by camera 140. Camera view interface 136 enables user 120 to see the camera view captured by camera 140, thereby assisting user 120 to align the camera view with a desired subject. Camera view interface 136 may be omitted from GUI 132 in at least some implementations.

Broadcaster computer 110 may further include an audio speaker 142 and an audio microphone 144. Audio of the game program being played by user 120 may be output locally by audio speaker 142. Audio generated by user 120 and/or the user's surroundings, such as the user's spoken commentary, may be captured by microphone 144.

Audio representations of game audio of the game program and microphone audio captured by microphone 144 may be streamed by broadcaster computer 110 to remote device 160 for presentation to remote viewers 170. Remote device 160 may output the audio of the game program and/or the audio captured remotely by microphone 144 via an audio speaker 190. Hence, remote viewers 170 may listen to game audio and microphone audio streamed from broadcaster computer 110. Microphone audio capturing spoken commentary of user 120 may be referred to as game player audio within the context of user 120 being a game player of a game program.

Remote device 160 also may enable remote viewers 170 to interact with the content being streamed. Via graphical display device 180, remote device 160 may output various interactive controls selectable by remote viewers 170 to affect the game program played by user 120. As examples, FIG. 1A shows the display of a health control 192 selectable to increase the health of a character (e.g., cyclist 193) of the game program controlled by user 120, and a speed control 194 selectable to increase the speed of the character. As another example of a control enabling remote viewer participation in the stream, FIG. 1A also shows the output at graphical display device 180 of a minimap 196 in which the position of the character controlled by user 120, as well as the positions of various non-player characters (NPCs), is displayed. Via minimap 196, remote viewers 170 may control NPC positions, issue attacks against NPCs, or supply input affecting NPCs in any other suitable manner.

Remote device 160 may output other types of interactive controls. As another example, FIG. 1A shows the display of a popup 198 that lists the health and speed of the character controlled by user 120. The placement of a cursor 197, displayed in graphical display device 180 and controlled by remote viewers 170, over the character may cause remote device 160 to query broadcaster computer 110 for these variables and thereby effect the display of popup 198, for example. FIG. 1A also shows a chat box 199 operable to receive and transmit messages between remote viewers 170 and user 120. In view of the above, the selection of the interactive controls described herein, and the events resulting from their selection, may be reflected on the broadcaster side (in the game program audio and/or game program video) and/or on the viewer side (in the stream representation of the game program audio and/or stream representation of the game program video).

Remote viewers 170 may interact with an interactive control and thereby participate in the game program executed on broadcaster computer 110 via any suitable input mechanism. For example, an input device operatively coupled to remote device 160 may be used to supply input, and may be configured as a handheld controller, mouse, remote, or other peripheral. Other examples include the use of an imaging device to receive gestural input and/or gaze input. Further, while shown in FIG. 1A in the form of a large-format television, remote device 160 may assume any suitable form. As another example, remote device 160 may be configured as a mobile computing device with an integrated touch sensor with which user input is received for participating in the game program.

Remote device 160 may receive other types of data from broadcaster computer 110 beyond visual and audio representations of the game program. In particular, broadcaster computer 110 may transmit state data regarding the state of the game program, such as various variables/parameters/fields regarding game program characters, items, levels, etc. For example, state data may include the position of the character controlled by user 120 and those of various NPCs around the character, which enables the display of minimap 196 and the representation therein of such character positions, and the health and speed variables associated with the player-controlled character, which enables the display of these variables in popup 198.

In addition to or in lieu of streaming representations of game audio and game video of the game program, a representation of an internal game state of the game program (e.g., as indicated by state data of the game program) may be sent by broadcaster computer 110 to remote device 160. Remote device 160 may interpret the representation of the internal game state in order to present content to remote viewers 170. For example, remote device 160 may use the internal game state to determine audiovisual output to be rendered and output at remote device 160. In this way, remote device 160 may show substantially similar audiovisual content to broadcaster computer 110, without requiring receiving a pre-rendered audio and/or visual stream, which may require a large bandwidth to stream over a network. Alternately, remote device 160 may show an audiovisual stream provided by broadcaster computer 110, augmented with additional information derived from the game state and not shown at broadcaster computer 110.

As broadcaster computer 110 and remote device 160 may differ in hardware, software, and/or input device modality, state data of the game program, as well as input from the remote device that affects the game program or causes a request for state data, may be processed when being transferred between the devices. In this way, data originating from a device that is suited for the configuration of that device can be adapted to another, differently configured device to enable cross-platform viewer participation in a game program. Further, the approaches described herein for enabling cross-platform interactive participation may apply to streamed programs and content other than game programs, including but not limited to e-sports, conventions and other events, and concerts and live performances.

As another example of a context in which cross-platform interactive streaming may be implemented, FIG. 1B depicts an example use-scenario in which a live event conducted in a use environment 900 is broadcast for interactive participation. FIG. 1B may represent any suitable live event, such as a presentation conducted in a convention booth, a concert or other performance, etc. The live event is conducted at least in part by a user 902, which may produce aspects of the live event via a broadcaster computer 904, shown in the form of a laptop computer. As such, user 902 and broadcaster computer 904 may be referred to as a "producer" and "producer computer", respectively, and a program utilized by the user executing on the computing device to produce and/or broadcast the live event may be referred to as a "broadcast program" and/or "production program".

User 902 may control aspects of the live event via one or more devices in use environment 900 that are communicatively coupled to broadcaster computer 904 via a suitable network connection. As examples, such devices may include speakers 906 (e.g., used to output music or other audio in use environment 900), a microphone 908 (e.g., used to receive speech uttered by user 902 for output to the speakers and/or for broadcasting to remote viewers), a display 910 (e.g., used to present graphical output viewable by other users in the use environment), and lights 912 (e.g., used to vary proximate lighting conditions, including but not limited to brightness, color, and/or pattern). FIG. 1B also depicts the inclusion of cameras 913A and 913B in environment 900. Camera 913A may produce a camera view of the overall environment 900, while camera 913B may be configured as a webcam coupled to broadcaster computer 904, and may produce a camera view of user 902 when positioned in front of camera 913B. Each camera view may be selectively presented locally via display 910 and/or broadcast for remote viewing. Broadcaster computer 904 is additionally communicatively coupled, via communication network 260, to other computing devices including one or more local or remote viewing devices, such as viewer computer 916. Communication network 260 may include any suitable type of communication network. For example, communication network 260 may include a local area network, a wide area network, and/or another type of network.

Aspects of the live event may be affected at least in part by local and/or remote participants in the live event other than user 902. As an example, FIG. 1C depicts a user 914 interacting with an audience computer 916, shown in the form of a smartphone, with which this user may affect aspects of the live event. User 914 may be local to use environment 900 (e.g., proximate to the booth occupied by user 902 or generally in the vicinity thereof) or remotely located in another environment. FIG. 1C also depicts a view of a user interface 918 that may be presented on a display of audience computer 916. User interface 918 may include various interactive controls selectable to affect aspects of the live event. Further, user interface 918 may be presented by a viewer program executing on audience computer 916, which may be referred to as a "viewer computer" or "audience computer".

In the depicted example, user interface 918 includes an interactive control 920 selectable to change the output of lights 912 (e.g., color, frequency, pattern), an interactive control 922 selectable to choose a song for playback in environment 900 via speakers 906, an interactive control 924 selectable to change the camera views(s) being presented via display 910 and/or those being remotely streamed, and an interactive control 926 selectable to generally vary the graphical output presented via display 910. In some examples, an interactive control may be configured to cast a vote for an option relating to that interactive control, rather than directly effecting a corresponding change in environment 900. For example, selection of interactive control 922 may enable user 914 to cast a vote for a subsequent song to be played in environment 900. An interactive control may be configured to cast votes in this manner for scenarios in which two or more local and/or remote users other than user 902 participate in the live event conducted in environment 900. In this example, upon selection of an interactive control to cast a particular vote, viewer computer 916 sends data describing the particular cast vote to broadcaster computer 904. Accordingly, broadcaster computer 904 receives a plurality of votes (from viewer computer 916 and from other viewing devices of other users) and counts the votes received over a designated time window. Broadcaster computer 904 may report the result of the tally or perform any suitable action based on the result, enabling mass participation in the live event directed by which options garner the most votes.

Changes to the presentation of the live event in environment 900 effected by interactive control selection in user interface 918, and aspects of the live event in general, may be reflected on audience computer 916. As examples, songs played in environment 900 may be output via one or more speakers of audience computer 916, output of display 910 in environment 900 may be presented in a window 928 of user interface 918, one or both camera feeds produced by cameras 913A and 913B may be presented in the same or different window, and output of lights 912 (e.g., as captured in the camera feed produced by camera 913B) may be presented in the same or different window. User interface 918 may include alternative or additional graphical content and/or controls. As further examples, FIG. 1C depicts a camera feed 930 produced by a camera of audience computer 916 that captures user 914, and which may be broadcast to other local and/or remote participants in the live event and/or to broadcaster computer 904, as well as a chat interface 932 operable to receive text input that can be shared with local and/or remote participants, and/or broadcaster computer 904.

Figure 1D:
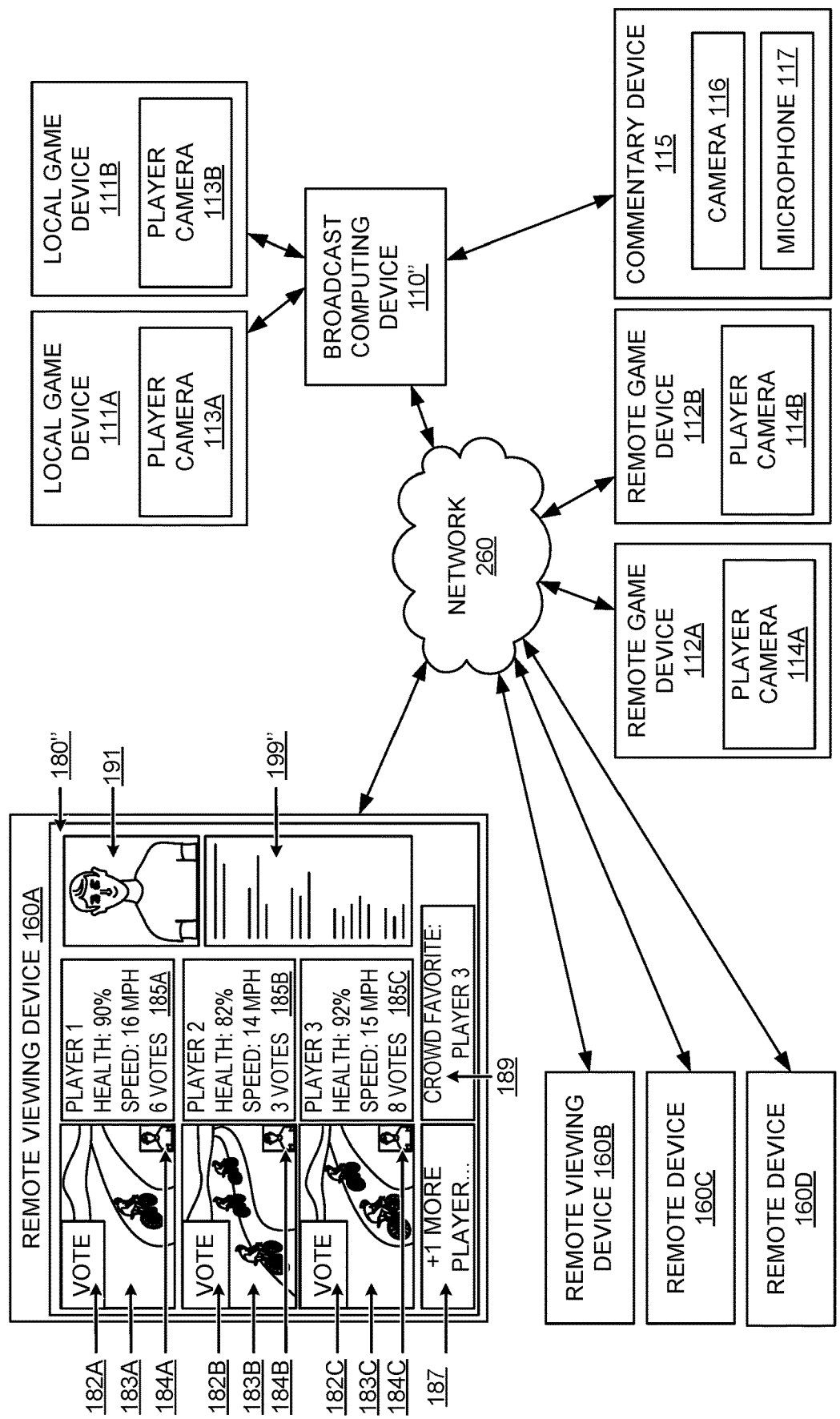

FIG. 1D shows another exemplary use-scenario for an interactive streaming system in which a broadcaster computer 110" executes a broadcast program, and presents a video stream with associated interactive controls to one or more remote devices, such as remote viewing devices 160A, 160B, 160C, and 160D, which may be referred to as "viewer computers" or "audience computers". In this example, graphical display 180" of remote viewing device 160A depicts an interactive broadcast of an e-sports event including streaming audiovisual data and associated interactive controls. A producer of the e-sports event may use broadcaster computer 110" to facilitate multiplayer game play of a multiplayer game by one or more players. Furthermore, the producer of the e-sports event may use a production software tool of broadcaster computer 110" to render a video stream with associated interactive controls, and to broadcast the video stream and associated interactive controls to one or more viewing devices. The video stream may additionally include a commentary stream produced by a commentator of the multiplayer video game using a commentary device 115.

Broadcaster computer 110" is communicatively coupled to commentary device 115 and to local game devices 111A and 111B, in any suitable fashion, for example, via a wired local area network. Broadcaster computer 110" is additionally communicatively coupled, via communication network 260, to other computing devices including remote game devices 112A and 112B, and remote viewing devices 160A, 160B, 160C, and 160D. Remote devices 160A, 160B, 160C, and 160D may be any suitable computing devices.

Broadcaster computer 110" may receive streaming audiovisual content, game state data, and any other suitable data from local game devices 111A and 111B, and from remote game devices 112A and 112B. In the depicted example, broadcaster computer 110" receives player input data of a multiplayer video game being played by users of local game devices 111A and 111B and remote game devices 112A and 112B. Additionally, broadcaster computer 110" may receive streaming audiovisual data from one or more cameras of the local and remote game devices, such as player camera 113A of local game device 111A or player camera 114B of remote game device 112B.

Broadcaster computer 110" may additionally receive streaming audiovisual content from commentary device 115. Such streaming audiovisual content may include data received from a camera 116 and/or a microphone 117 of commentary device 115. For example, commentary device 115 may be a computing device of a play-by-play commentator and/or analyst covering the e-sports event, and the data received from camera 116 and microphone 117 may be game commentary of the multiplayer video game (e.g., including analysis of the game so far, and predictions of a possible outcome). In other examples, commentary device 115 may collect streaming audiovisual content from a plurality of commentators (e.g., a panel of commentators) who may be local or remote to commentary device 115. In the depicted example, broadcaster computer 110" is configured to act as a game server of the multiplayer video game, including interpreting player inputs from the local and remote game devices, computing an updated game state, and sending a computer-readable description of the updated game state to the local and remote game devices. Broadcaster computer 110" may be a device administrated by an organizer of a competitive e-sports event. By computing each update to the game state, broadcaster computer 110" determines each subsequent game state and a final result of the multiplayer video game. Because broadcaster computer 110" is administered by the organizer of the competitive e-sports event, broadcaster computer 110" may act as a fair "referee" for a competitive game. In this way, players of the multiplayer video game may be prevented from cheating or abusing unintended behavior of a client of the multiplayer video game.

In addition, broadcaster computer 110" may render one or more rendered views of the updated game state to produce an update to an audiovisual stream of the multiplayer video game. Broadcaster computer 110" may additionally determine statistics of the multiplayer game or any other suitable analysis of the updated game state. The broadcast program of broadcaster computer 110" may composite together any suitable audiovisual data for broadcast in an e-sports stream. For example, as depicted in graphical display 180" of remote viewing device 160A, the composited audiovisual data may include: 1) the one or more rendered views of the updated game state (such as rendered view of a first player, 182A; rendered view of a second player 182B, and rendered view of a third player 182C); 2) the one or more audiovisual streams depicting data received from player cameras (such as player camera stream 184A depicting the first player based on data received from player camera 113A of the first player's computer, or such as player camera stream 184B of the second player, or player camera stream 184C of the third player); 3) a visual presentation of statistics and/or analysis (such as player statistics 185A, 185B, and 185C); 4) the audiovisual stream received from commentary device 115 (such as commentary stream 191 depicting a commentator of the multiplayer video game).

Broadcaster computer 110" may additionally send data specifying one or more custom control elements to the remote viewing devices, which upon reception of the data may present a custom GUI interface to the remote viewers. Broadcaster computer 110" may send any suitable custom control elements to the remote devices. Furthermore, broadcaster computer 110" may send different custom control elements to different subsets of the remote devices, the custom control elements associated with features of the audiovisual stream. For example, graphical display 180" of remote viewing device 160A depicts custom controls including voting buttons (such as voting buttons 182A, 182B, and 182C) allowing a viewer to engage in an online vote which may determine a future state of the audiovisual stream and/or interactive controls, as described above with reference to FIGS. 1B-1C. For example, graphical display 180" shows a result of a recent or ongoing vote in vote result indicator 189, which depicts a crowd favorite, or as described by the voting statistics included in in player statistics 185A, 185B, and 185C). The custom controls also include chat interface 199", which may allow a viewer to engage in online discussions by viewing past discussions in a chat log and contributing new commentary by submitting textual messages to be logged in the chat log.

The custom controls further include a button 187 to show an additional player of the multiplayer game, enabling a viewer to see all four players of the multiplayer game even though by default the audiovisual stream only includes a view of three of the four players. The custom controls may further include any other suitable control related to observing and/or interacting with the audiovisual stream. For example, a viewer may be able to select one of the depictions of player statistics (e.g., player statistics 185A) to see additional detailed statistics of the player, which may include statistics related to the multiplayer game being played as well as other statistics of the player, such as a record of previous games. Custom controls may also facilitate interacting with a producer and/or commentator of the e-sports stream, for example, by sending a message (such as a question for the commentator) to broadcaster computer 110" and/or to commentary device 115 to be viewed by the producer and/or commentator.

In this or other examples, the custom controls sent to the remote devices may include any other custom control (e.g., one or more of the interactive controls described above with regard to FIGS. 1A-1C). For example, the custom controls may include a control to choose a next audio track to be played in a queue of audio tracks associated with the e-sports stream. In a competitive e-sports event, it may not be appropriate to allow custom controls to directly affect gameplay of the multiplayer video game (so that the gameplay remains competitive and fair for the players). Broadcaster computer 110" may provide custom controls that offer any level of indirect or direct influence over subsequent content of the e-sports stream.

Broadcaster computer 110" may also provide custom controls to facilitate betting (e.g., by placing wagers based on predicting an outcome of the e-sports event and/or sub-events within the e-sports event). Broadcaster computer 110" may determine the outcome of each placed wager, according to received computer-readable descriptions associated with the custom controls and according to the game state of the multiplayer game. Thus, broadcaster computer 110" may act as a fair "referee" or "bookkeeper," allowing a viewer to place bets with other viewers and/or the house, with confidence that the placed bet will be correctly executed based on the outcome of the e-sports event.

Remote devices 160B, 160C, and 160D may also include graphical displays which may output similar or identical content to the content shown in graphical display 180". Content output to a particular remote device may vary based at least on a user preference, nationalization settings, parental control settings, and/or any other suitable configuration of the particular remote device.

Figure 2A:
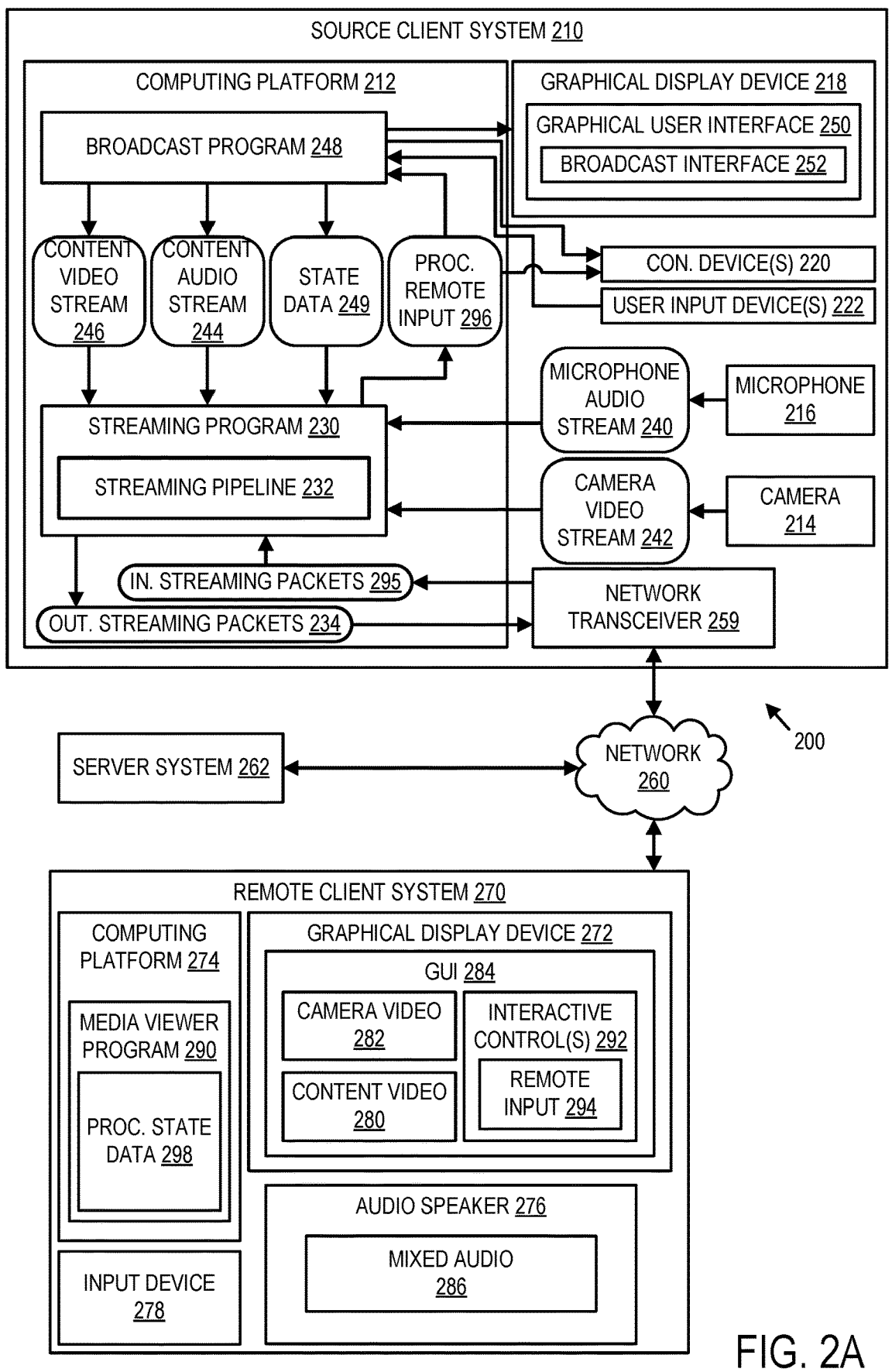

FIG. 2A is a schematic diagram depicting an example audiovisual streaming environment 200. A source client system 210 of environment 200 includes a computing platform 212, a camera 214, a microphone 216, graphical display device 218, one or more controllable devices 220 (e.g., an audio speaker), and one or more user input devices 222. Broadcaster computers 110, 904, and 110" of FIGS. 1A-1D are non-limiting examples of source client system 210. However, source client system 210 may take other suitable forms, including computing devices that include a single integrated enclosure, and computing systems that have two or more separate enclosures. As source client system 210 may facilitate the streaming or broadcast of audiovisual content, the source client system may be referred to as a "broadcaster computer" or "streamer computer".

Computing platform 212 may execute or otherwise implement a broadcast/streaming program 230 that receives audio and/or video from multiple sources, processes the audio and/or video through a streaming pipeline 232, and outputs outbound streaming packets 234 for delivery to a recipient. For example, streaming program 230 may receive a microphone audio stream 240 that is generated by microphone 216, a camera video stream 242 that is generated by camera 214, a content audio stream 244 of a broadcast program 248, and a content video stream 246 of the broadcast program 248. For example, microphone audio stream 240 and content audio stream 244 each may include a plurality of uncompressed audio frames, and camera video stream 242 and content video stream 246 each may include a plurality of uncompressed video frames. Broadcast program 248 may be executed at computing platform 212 in at least some implementations. However, broadcast program 248 may be at least partially remotely executed at a remote computing platform, such as server system 262 in other implementations.

Streaming program 230 may receive state data 249 from broadcast program 248. State data 249 may include variables/parameters/fields/etc. regarding the content of the audiovisual broadcast. For example, broadcast program 248 may be a game program configured to broadcast game video and game audio. In this example, state data 249 may be game state data of the game program, including characters, items, levels, etc., of the game program, and/or other data beyond audio and video representations of the game program that generally relates to the internal state of the game program. In some examples, streaming pipeline 232 may output state data 249 as part of, or separately from, outbound streaming packets 234 for delivery to a recipient.

Streaming environment 200 may be implemented for other types of programs and content, including but not limited to e-sports (e.g., in which multiple streams corresponding to different players in a multiplayer game program may be produced, potentially in combination with streams corresponding to producers/broadcasters/commentators), events (e.g., convention events, live concerts, or other live performances). The events illustrated in FIGS. 1B and 1D are examples of some of the events that may be streamed using such a broadcast/production program producing such outputs.

The exchange of various data in streaming environment 200 may be referred to in terms of the data being electronically communicated throughout various locations in the environment. For example, electronically communicating with broadcast program 248 may include receiving one or more of content audio stream 244, content video stream 246, and state data 249. Such data may be received at source client system 210 (e.g., at a computing device on which broadcast program 248 is executed, such as at streaming program 230), and/or a remote computing system such as a server system 262 and/or remote client system 270, both described below. Electronic communication refers to communication between different hardware or software aspects within a single device (e.g., program to program communication via an Application Programming Interface), as well as between different devices (e.g., network communication).

Streaming program 230 may be distributed across two or more computing devices that collectively form computing platform 212. As an example, computing platform 212 may include one or more general-purpose processors and/or one or more special purpose logic machines (e.g., a video encoder, graphics processing unit). In this example, streaming program 230 may include software executable by the one or more general-purpose processors, and may include firmware or hardware instructions executable by the one or more special purpose logic machines. Streaming program 230 may take any suitable form. For example, streaming program 230 may be implemented as a dedicated streaming application. In another example, streaming program 230 may be a component of an application, such as video broadcast program 248. In other examples, streaming program 230 may be implemented as a service, an application programming interface (API), an application modification (e.g., a video game modification of a video game program providing the functionality of broadcast program 248), and/or a plug-in. In still another example, streaming program 230 may be implemented by an operating system of source client system 210. At least a portion of streaming program 230 may instead be implemented at server system 262. In such examples, source client system 210 may transmit state data 249 to server system 262, and the server system may render game video and audio streams based on the game state data.

Graphical display device 218 may further present a broadcast interface 252 of broadcast program 248 as a component of GUI 250. Game interface 134 of FIG. 1A is a non-limiting example of broadcast interface 252. When broadcast program 248 is a video game program, broadcast interface 252 may correspond to a game view presented to a player of the video game program.

Streaming pipeline 232 is configured to produce streams from multiple sources. Streaming pipeline 232 may encode different data streams based on the state of the streaming program 230 and/or the data streams received by the streaming program 230. For example, when broadcast program 248 is a video game program, then the streaming program 230 may receive five separate data streams: the microphone audio stream 240, the camera video stream 242, the content audio stream 244 including game audio, the content video stream 246 including game video, and the state data 249 including game state data. In another example, if the user is live-streaming content without providing additional audiovisual content via broadcast program 248, then the streaming program 230 may receive two separate data streams: the microphone audio stream 240 and the camera video stream 242. Streaming program 230 may facilitate the encoding, synchronization, processing, and transmission of any suitable combination of different input data streams. In another example, streaming pipeline 232 may encode audio, video, and/or state data streams corresponding to multiple participants in an e-sports or other live event, producers, broadcasters, commentators, etc.

In some implementations, streaming pipeline 232 may be configured to package encoded audio and video streams together in the same streaming packets. In other implementations, streaming pipeline 232 may be configured to package the encoded audio stream into streaming audio packets and package the encoded video stream into separate streaming video packets. In other words, streaming pipeline 232 may be configured to process the audio streams and video streams together or separately. Similarly, streaming pipeline 232 may package state data 249 together with, or separately from, one or both of the audio streams and video streams.

Streaming pipeline 232 is configured to output outbound streaming packets 234 to a remote client system 270 via a network transceiver 259. Network transceiver 259 may be configured to send outbound streaming packets 234 to remote client system 270 via a communications network 260. Communication network 260 may include any suitable type of communication network. For example, communication network 260 may include a local area network, a wide area network, and/or another type of network. Network transceiver 259 may include wired and/or wireless communication hardware components compatible with one or more different communication protocols. Network transceiver 259 may be configured to send outbound streaming packets 234 to remote client system 270 according to any suitable wireless communication protocol.

In at least some implementations, server system 262 may receive outbound streaming packets 234 that encode audio, video, and state data streams from source client system 210, and may facilitate the broadcast of the audio, video, and state data streams to a population of many remote client systems, such as remote client system 270. In other implementations, source client system 210 may stream audio, video, and state data directly to receiving client system 270 without the use of an intermediate server system. In some examples, the streaming program 230 may be configured to open a socket connection with server system 262 and/or remote client system 270 via network transceiver 259, and send outbound streaming packets 234 substantially in real-time.

Remote client system 270 may include a graphical display device 272, a computing platform 274, an audio speaker 276, and an input device 278. Computing platform 274 may execute a media viewer program 290 that receives streaming audio, video, and/or game state data in the form of streaming packets from a source, such as source client system 210 or server system 262. Media viewer program 290 may be configured to decode the received streaming packets to extract the audio, video, and/or state data streams to facilitate the presentation of the streaming audio and/or video, and/or use of the state data. For example, content video 280 and camera video 282 may be presented via graphical display 272, and mixed audio 286 may be output by audio speaker 276. Because the audio and video streams are synchronized prior to being packaged into the streaming packets by the streaming pipeline 232 of the source client system 210, media viewer program 290 does not have to buffer and synchronize the incoming audio and video streams. Although, in some implementations, remote client system 270 may perform buffering and/or synchronization operations on received streaming packets. For example, remote client system 270 may use a jitter buffer to properly order incoming streaming packets.

Media viewer program 290 may be configured to provide one or more interactive controls 292 that enable interaction between remote client system 270 and source client system 210. In some examples, the selection of an interactive control 292 may affect broadcast program 248 on source client system 210. Accordingly, FIG. 2A shows the generation of remote input 294 upon selection of an interactive control 292 via input device 278. Remote input 294 is transmitted to source client system 210 through network 260 and network transceiver 259 and received in the form of inbound streaming packets 295. Inbound streaming packets 295 may be relayed to source client system 210 via server system 262, while in other implementations remote client system 270 may transmit the inbound streaming packets directly to source client system 210.

An interactive control 292 may be configured based on state data 249 received in outbound streaming packets 234 from source client system 210. As examples with reference to FIG. 1A, when broadcast program 28 is a video game program, interactive control(s) 292 may include one or more of controls 192 and 194, which upon selection may cause the transmission of remote input that affects the state of the video game program, and controls 196 and 198, which may be configured according to state data 249 received from source client system 210. In some examples described below, interactive control(s) 292 may be configured based on processed state data formed by processing state data 249 to thereby adapt the (unprocessed) state data to the configuration of remote client system 270.

In further examples with reference to FIGS. 1B-1C, interactive control(s) 292 may include one or more of controls 920, 922, 924, and 926, which upon selection may cause the transmission of remote input that affects the state of broadcast program 248 executed on broadcaster computer 904. As described above, selection of interactive controls 920, 922, 924, and 926 may affect the operation of one or more devices (e.g., broadcaster computer 904, speakers 906, display 910, lights 912, cameras 913) in environment 900. As such, input generated via selection of interactive control(s) 292 may affect the operation of one or more devices in or communicatively coupled to source client system 210. FIG. 2A illustrates such operational effect, showing the supply of processed remote input 296, formed by processing remote input 294 based on the configuration of source client system 210 as described below, to controllable device(s) 220, which may comprise one or more devices included in or operatively coupled to the source client system, including but not limited to a display device, speaker, light, camera, etc.

In the depicted example, mixed audio 286 corresponds to audio streamed by source client system 210, which includes microphone audio stream 240 and content audio stream 244. Also in this example, content video 280 corresponds to a visual representation of content video stream 246, and camera video 282 corresponds to a visual representation of camera video stream 242. Content video 280 and camera video 282 may be composited prior to streaming in at least some implementations. While game video and camera video are shown in FIG. 2A in a side-by-side configuration within a common GUI 284, it will be understood that other suitable configurations may be supported. For example, camera video 282 may be overlaid upon content video 280 or vice-versa. As another example, a user may selectively toggle between a view of content video 280 and a view of camera video 282. As such, content video 280 and camera video 282 may not be concurrently presented in at least some implementations. For broadcast/production programs executed on source client system 210, a user may selectively toggle between different video streams, which may be presented in any suitable manner. Similarly, an interactive control 292 may be displayed in GUI 284 together with content video 280 and camera video 282, or in a GUI separate from one or both of the game video and camera video.

Remote client system 270 may take any suitable form. For example, remote client system 270 may include one or more of a mobile computer (e.g., smartphone), a laptop computer, a desktop computer, a virtual-reality computer, an augmented-reality computer, and a gaming computer. With reference to FIGS. 1A and 1C, remote client system 270 may be remote device 160 or audience computer 916, for example. As such, remote client system 270 may be referred to as a "viewer computer" or "audience computer." Further, media viewer program 290 may be any suitable type of program configured to present digital media content. In one example, media viewer program 290 is an Internet browser. In another example, media viewer program 290 is incorporated into a video game program.

In the depicted example, streaming is discussed in terms of being sent from a mobile computing device, although it will be appreciated that streaming may be sent from other types of computing devices having different processing and storage capabilities.

In some implementations, source client system 210 and remote client system 270 may differ in hardware, software, and input modalities. As a result, data (e.g., state data 249, remote input 294) transmitted by one system may be specific to the configuration of that system, and thus may be unsuitable for a recipient system and its configuration. This may render the recipient system unable to interpret the data and incapable of providing functionality dependent upon such data.

As a particular example of how differing configurations between source client system 210 and remote client system 270 may manifest, broadcast program 248, when configured as a video game program, may execute, via a proprietary game engine, methods written in a strongly typed, compiled programming language such as C++. In contrast, media viewer program 290 may provide interactive control(s) 292 via web-based markup such as HTML and CSS, where the interactive control(s) are selectable to execute methods written in a weakly typed, interpreted programming language such as JavaScript. Accordingly, state data 249 from source client system 210 may be unsuitable for interpretation by media viewer program 290—for example, the state data may include complex datatypes that the media viewer program is not configured to handle. Similar issues may be associated with the interpretation of remote input 294 from remote client system 270 by source client system 210.

Yet another issue associated with the differing configurations of source client system 210 and remote client system 270 may relate to remote invocation. As described above, an interactive control 292 may be configured upon selection to effect a function/method in broadcast program 248 corresponding to how the interactive control is labeled or otherwise presented in GUI 284. For example with reference to FIG. 1A, speed control 194 is configured upon selection to invoke a corresponding method within the game program played on broadcaster computer 110 that increases the speed of the player-controlled character in the game program. However, the selection of speed control 194 involves finding and remotely invoking the corresponding speed-increasing method within the game program. This may involve crossing a programming language boundary, as speed control 194 may be configured to execute a JavaScript method that requests the remote invocation of a corresponding method within the game program written in C++ for its proprietary game engine. Similar issues may arise when attempting to remotely invoke, at a client device, methods associated with devices operatively coupled to a source device.

Still other issues may be associated with the differing configurations of source client system 210 and remote client system 270. To enable the substantially live, real-time participation by remote client system 270 in broadcast program 248, state data 249 may be synchronized between the remote client system and source client system 210. However, synchronization may involve the transfer of data across a programming language boundary, and in some examples may involve remote invocation.

To address these and other issues associated with the differing hardware, software, and input modalities between source client system 210 and remote client system 270, various engines are disclosed herein for processing and adapting data to a recipient system configuration, handling remote invocations, and synchronizing data between systems. The engines may enable the interactive participation by remote client system 270 in broadcast program 248.

The engines may be implemented at various location(s) within streaming environment 200, examples of which are represented in FIGS. 2B-2E. Each engine may include software, firmware, hardware, or a combination thereof. FIG. 2B depicts the implementation of one or more of a translation engine, a remote invocation engine, and a synchronization engine—collectively designated engine(s) 299 in FIGS. 2B-2E—at server system 262. The implementation of engine(s) 299 may include electronic communication (e.g., transfer of video, audio, program state, and/or client system input data) between server system 262, which may function as a remote computing system relative to source client system 210, and broadcast program 248 (or an event production/broadcast program) executing on the source client system. For examples in which at least a portion of streaming program 230 is implemented on server system 262, electronic communication may occur between the streaming program executing on the server system and broadcast program 248 executing on source client system 210. The computational expense associated with facilitating an interactive stream may be reduced at source client system 210 and remote client system 270 by implementing engine(s) 299 at server system 262.

As another example, FIG. 2C depicts the implementation of engine(s) 299 at source client system 210—e.g., as part of streaming program 230. In this example, the implementation of engine(s) 299 may include electronic communication between different hardware and/or software portions of source client system 210. For example, electronic communication may occur between streaming program 230 executing on source client system 210 and broadcast program 248 also executing on the source client system.

As yet another example, FIG. 2D depicts the implementation of engine(s) 299 at remote client system 270—e.g., as part of media viewer program 290. As still another example, FIG. 2E depicts the implementation of engine(s) 299 at each of source client system 210, server system 262, and remote client system 270. In this example, various functionality associated with engines 299 is distributed across the client and server systems in streaming environment 200. Further, in some examples one or more of source client system 210, server system 262, and remote client system 270 may implement only a portion, and not the entirety, of engine(s) 299.

An example translation engine is described below with reference to FIG. 3, an example remote invocation engine is described below with reference to FIG. 4, and an example synchronization engine is described below with reference to FIG. 5.

Engine(s) 299 may be used to process data exchanged between source client system 210 and remote client system 270, and thereby enable participation by the remote client system in broadcast program 248. For example, remote input 294, generated at remote client system 270 upon the selection of an interactive control 292, may be processed to form processed remote input 296 that is then fed to broadcast program 248. Unlike (unprocessed) remote input 294, processed remote input 296 may be suitable for the configuration of source client system 210 and its interpretation by broadcast program 248. FIG. 2A shows the processing, based on the configuration of remote client system 270, of unprocessed state data 249, generated by broadcast program 248 at source client system 210, to form processed state data 298 that is then electronically communicated to media viewer program 290. Unlike (unprocessed) state data 249, processed state data 298 may be suitable for the configuration of remote client system 270 and its interpretation by media viewer program 290. In view of the above, electronically communicating with viewer program 290 may include receiving remote input 294 from the viewer program, and/or transmitting processed state data 298 to the viewer program. Electronically communicating with broadcast program 248 may include transmitting processed remote input 296 to the game program. Electronic communication may occur between/among various devices in streaming environment 200, depending on where engine(s) 299 are implemented and where data is processed for adaptation to a recipient device.

As described above, streaming environment 200 may be implemented for various programs executed on source client system 210. As examples, streaming environment 200 may enable interactive streaming for a broadcast/production program (e.g., such as that executed on broadcaster computer 904 of FIG. 1B and used to broadcast the live event conducted in environment 900 and enable interactive participation therewith), a broadcast/production program used to enable interactive participation in the e-sports game program described above with reference to FIG. 1D, or a broadcast/production program used to enable interactive participation in a convention, concert, or other live event or performance. In these examples, electronic communication may occur between various devices in environment 200 depending on the implementation of engine(s) 299 and streaming program 230. For example, electronic communication may occur with a broadcast program executing on a broadcaster computer configured to stream a broadcast of the broadcast program, and with a viewer program executing on an audience computer configured to remotely present the broadcast of the broadcast program. Data exchanged between the broadcaster and audience computer may be processed, as the broadcast program may support a set of broadcast program methods and not a set of viewer program methods, whereas the viewer program may support the set of viewer program methods and not the set of broadcast program methods. Data exchanged between the broadcaster and audience computer may include video stream(s) of the broadcast program, audio stream(s) of the broadcast program, state data stream(s) of the broadcast program including data relating to variables/parameters/fields and/or other aspects of the internal state of the broadcast program, and/or remote input from the audience computer, which may include an indication of an invoked viewer program method.

Figure 3:
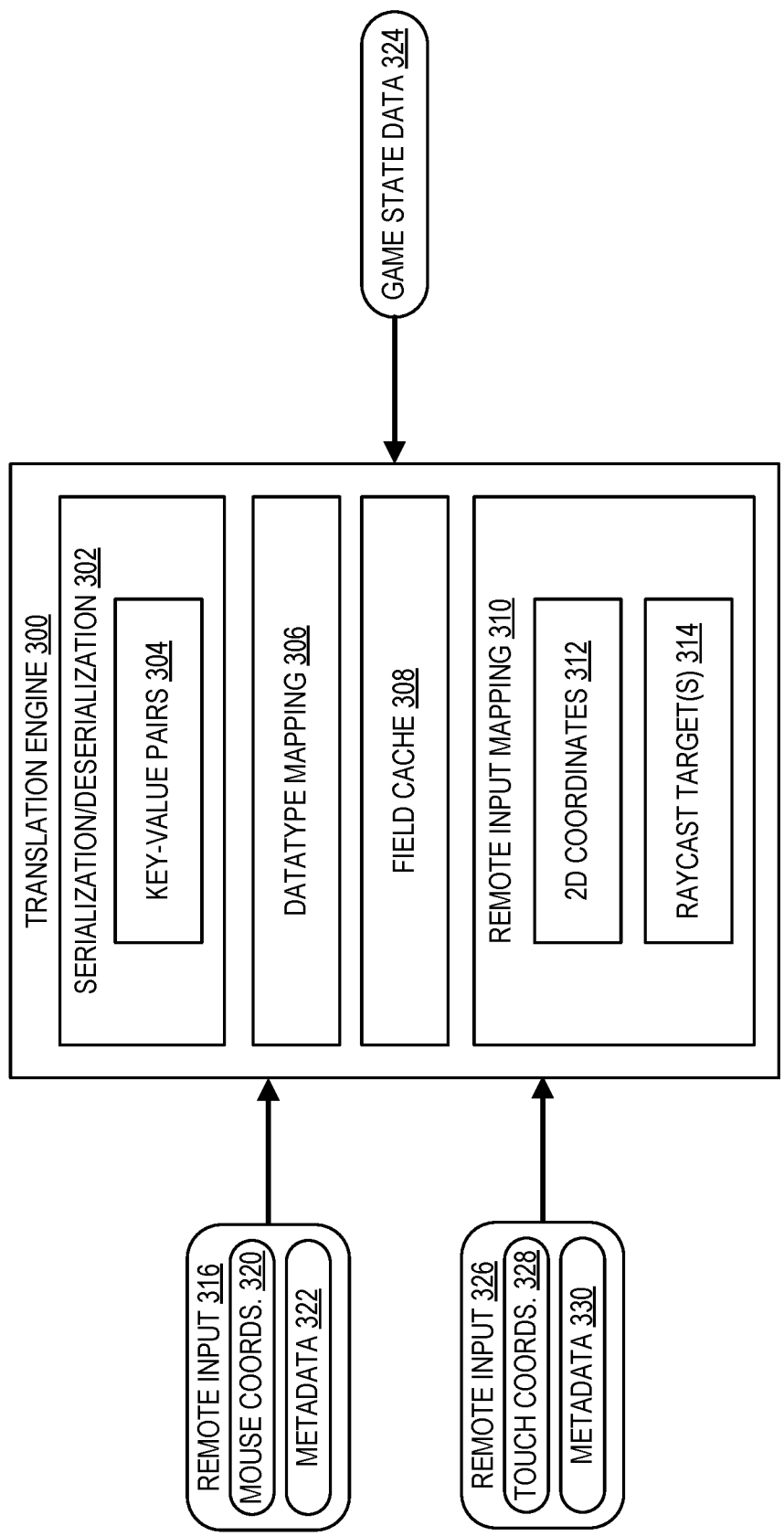
FIG. 3 is a schematic diagram depicting an example translation engine.

FIG. 3 is a schematic diagram depicting an example translation engine 300. Generally, translation engine 300 is configured to facilitate the exchange of data among computing devices of differing configuration by translating output from one computing device into a processed form that can be interpreted by another, differently configured computing device. Translation engine 300 may perform data translation when a transmitting computing device and a recipient computing device differ with respect to the hardware, software, and/or input devices they employ, for example. Translation engine 300 may be implemented in engine(s) 299 of FIGS. 2B-2E.

Translation engine 300 may include a serialization/deserialization module 302 configured to serialize or deserialize input. Module 302 may be used to translate a data structure into a sequence of bytes—for example, the module may translate a relatively complex data structure written in C++ into a sequence of bytes that can be interpreted, or further processed so as to be interpretable, in JavaScript, which would otherwise be incapable of interpreting the C++ data structure. In some implementations, module 302 may produce data according to the JavaScript Object Notation (JSON) file format. For example as indicated at 304, module 302 may translate key-value pairs into a JSON array, which can be interpreted in JavaScript.

Translation engine 300 may include a datatype mapping module 306 configured to map input of a first datatype to a second datatype. In some implementations, module 306 may map input between datatypes of different programming languages. For example, module 306 may receive input in a first programming language, and in mapping the input to a second programming language, may identify the lowest common denominator datatype between the two programming languages. Alternatively or additionally, a lowest common denominator may be identified between computing devices, operating systems, broadcast and viewer programs, etc. Module 306 may then map the input to the second programming language by mapping the input to the lowest common denominator datatype, which may include number, Boolean, and/or string datatypes. As an example, module 306 may map double and floating point datatypes (and potentially other number-oriented datatypes) to a number datatype. Module 306 may also map input of relatively more simple datatypes to relatively more complex datatypes (e.g., when mapping an object in JavaScript to an object in C++). Module 306 may employ a field cache 308 in mapping input. Field cache 308 may store fields and metadata regarding the fields such as datatype information, which may enable casting between different datatypes.

Translation engine 300 may include a remote input mapping module 310 configured to map remote input from one computing system to a game program, broadcast program, event production program, or other interactive experience executed on a remote computing system. As indicated at 312, remote input mapped by module 310 may include two-dimensional coordinates (e.g., an x/y coordinate pair). For example, a viewer may provide computing input applied to a broadcast remotely presented by an audience computer (e.g., by hovering a cursor, touching a screen, providing a mouse click, pointing, etc.) that is resolved to a two-dimensional x/y coordinate. A two-dimensional coordinate pair may be mapped to a two-dimensional or three-dimensional location within a game program by one or more matrix transformations, for example. As indicated at 314, module 310 may perform a raycast through a two-dimensional location corresponding to a user input to identify one or more targets intersected by the raycast. In some examples, module 310 may return the first target intersected by the raycast, while in other examples the module may return two or more, or all, targets intersected by the raycast.

To illustrate the use of translation engine 300, FIG. 3 shows the supply of remote input 316 to the translation engine for processing. Remote input 316 is generated via a computer mouse operatively coupled to a remote client system (e.g., remote device 160, remote client system 270), and accordingly includes a two-dimensional pair of mouse coordinates 320. With exemplary reference to FIG. 1A, remote input 316 may include the two-dimensional mouse coordinates corresponding to cursor 197 and its placement over the player-controlled character of the game program executed on broadcaster computer 110. Remote input 316 further includes metadata 322, which may enable the mapping of coordinates 320 to a location in a game program. For example with continued reference to FIG. 1A, metadata 322 may include data regarding the dimensions of graphical content 182, so that the location of cursor 197 relative to the view of the game program presented via the graphical content is known and can be mapped to an appropriate location in the game program. In other examples, metadata 322 may include data regarding the dimensions of an Internet browser used to present a broadcast of a broadcast program, and/or data regarding the dimensions of a window in which the broadcast itself is presented.

Via module 302, translation engine 300 may serialize remote input 316, and may potentially perform datatype mapping via modules 306 and/or 308. This processed form of remote input 316 may then be mapped to a location within the game program via module 310 based on coordinates 320 and metadata 322, and one or more targets in the game program may be identified by raycasting from a virtual camera location through the game program location. For example with reference to FIG. 1A, raycasting through the location in the game program to which the coordinates of cursor 197 are mapped may return an intersection with the player-controlled character in the game program. In response, the game program may transmit game state data 324 (e.g., state data 249) enabling the display of popup 198 and the character variables therein. Translation engine 300 may process game state data to form processed game state data (e.g., processed state data 298) that can be interpreted by a remote client system. With reference to a broadcast program such as that utilized to broadcast the live event conducted in environment 900 of FIG. 1B, engine 300 may acquire unprocessed state data from the broadcast program, process the unprocessed state based on a configuration of an audience computer (e.g., audience computer 916) to form processed state data, and electronically communicate the processed state data to a viewer program (e.g., viewer program 290 of FIG. 2A) executing on the audience computer.

Translation engine 300 may process input from a plurality of computing systems that span a variety of hardware, software, and input device modalities. To this end, FIG. 3 shows the supply of remote input 326 generated via a touch sensor of a remote client system. Remote input 326 includes a two-dimensional pair of touch coordinates 328. Remote input 326 further includes metadata 330, which may enable the mapping of coordinates 328 to a game program location by indicating the dimensions of a view of the game program presented via the remote client system.

In some examples, one or more features of translation engine 300 may be implemented as an application programming interface (API). For example, an API may implement at least portions of modules 302 and/or 310 by receiving an input of a two-dimensional coordinate pair, mapping the coordinate pair to a two-dimensional or three-dimensional broadcast program location, raycasting to identify one or more targets, and returning the identified target(s). The API may be configured as an event-based API or polling-based API. Further, the API, or another API, may implement the translation of key-value pairs into a JSON array (e.g., for interpretation by JavaScript). The API implementation of translation engine 300 in this manner may enable developers of a broadcast program to access features of the translation engine in a streamlined manner, without placing the burden of implementing such features on the developer or requiring extensive configuration of the broadcast program for computing systems of remote participants of the broadcast program or the viewer programs with which they participate.

Figure 4:
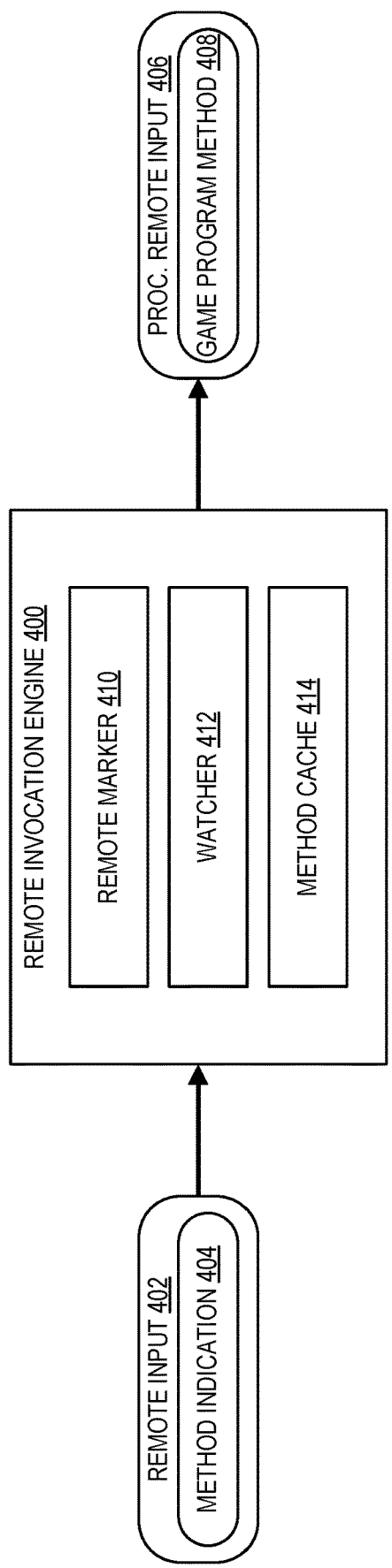
FIG. 4 is a schematic diagram depicting an example remote invocation engine.

FIG. 4 is a schematic diagram depicting an example remote invocation engine 400. Generally, engine 400 is configured to facilitate the invocation, as requested by a remote client system participating in a broadcast program, of methods provided by the broadcast program executed on a source client system. Engine 400 may be implemented in engine(s) 299 of FIGS. 2B-2E.

FIG. 4 shows the reception at engine 400 of remote input 402 including an indication 404 of an invoked viewer program method received from a remote client system. With exemplary reference to FIG. 1A, indication 404 may result from the selection of speed control 194, and may effect the invocation of a corresponding method of the game program executed on broadcaster computer 110—e.g., a method that increases the speed of the player-controlled character. Via the modules described below, engine 400 processes remote input 402 and indication 404 to thereby produce processed remote input 406 including an indication of a corresponding game program method 408 that can be executed to effect the speed-increasing method in the game program.

Engine 400 may include a remote marker module 410 configured to mark methods and variables that can be called remotely as a result of remote input 402—e.g., those methods and variables that can be called/passed on a computing system that executes the game program and is remote relative to the computing system issuing the method request. Module 410 may be employed so that remote methods are securely called while preventing the calling of arbitrary methods. Thus, in some examples, at least a portion of a set of broadcast program methods of a broadcast program executing on a broadcaster computer may be blocked from being remotely called from an audience computer.

Engine 400 may include a watcher module 412 that adds methods to a method cache 414. In some examples, watcher module 412 may initialize method cache 414 upon startup (e.g., upon initiation of a game program) by adding broadcast program methods and metadata associated with the broadcast program methods to the method cache. Upon receiving indication 404 and the requested method therein, module 408 may attempt to identify a game program method that matches the requested method by analyzing at least a portion of the metadata stored in cache 410. Various metadata criteria may be used to find a matching method, including but not limited to method name, number of parameters taken by a method, datatypes of output produced by a method, and/or datatypes of parameters taken by the method. As an example with reference to FIG. 1A, the selection of speed control 194 may cause the generation of an indication of an invoked viewer program method of the speed control corresponding to a game program method that increases the speed of the player-controlled character. The indication may identify the corresponding game program method by name—e.g., "IncreaseSpeed( )". Method cache 414 may then be searched for a game program method with the same or similar name. If a matching game program method entitled IncreaseSpeed( ) is found, an indication of the method may be passed to the game program for execution to effectuate output of the game program, where the output corresponds to the indicated game program method (e.g., output in the form of the display of popup 198). If a matching game program method cannot be found, engine 400 may return an error message.

In some examples, several game program methods may be found in method cache 414 that match a method in indication 404. In this case, engine 400 may compare the field datatype(s) of the candidate game program methods to those implicated by indication 404. This comparison may include casting datatypes to identify the game program method that best matches the requested method, which in some examples may be carried out via datatype mapping module 306 of translation engine 300, for example. Datatype information for game program methods, which may be used to perform method matching in this manner, may be cached in field cache 308, method cache 414, and/or a separate cache.

An indication of an invoked viewer program method of a viewer program executing on an audience computer, which may be translated by engine 400 into a corresponding indication of a method of a game, broadcast, or other program executing on a broadcaster program, may be configured in various manners. In some examples, the indication of the invoked viewer program method may explicitly identify or suggest the corresponding broadcast program method—e.g., by name. For example with reference to FIG. 1A, selection of interactive control 192 may generate an indication of an invoked viewer program method, which may have the same, or a similar, name as a corresponding game program method to which the invoked viewer program method can be matched. In other examples, a broadcast program method may be inferred from an indication of an invoked viewer program method, which does not identify or suggest the broadcast program method. For example again with reference to FIG. 1A, the application of cursor 197 to a location corresponding to cyclist 193 may lead to a corresponding game program method being inferred. Specifically, the game program method may be inferred from the context of the indication—namely, that a 2D coordinate was applied to cyclist 193, implying that the game program method effecting display of popup 198 should be executed.

While method cache 414 may be initialized upon startup as described above, additional broadcast program methods may become available after startup. For example when the broadcast program is a game program, game program assets, such as a new level, character, library, etc., may be loaded by the game program after startup, causing the availability of additional methods. In this case, engine 400 may refresh method cache 414 by caching additional game program method(s) loaded by the game program following startup of the game program to capture any added game program methods, which may then be found upon subsequent lookups. Engine 400 may refresh method cache 414 in response to failing to find a matching game program method, or in response to any other suitable trigger.

In some examples, engine 400 may be implemented in a context where participation in a streamed experience, and/or the streamed experience itself, is substantially real-time. To facilitate a substantially real-time experience, inputs from audience computers that affect the experience executed on a broadcaster computer, and/or outputs from the broadcaster computer that are reflected in broadcasts presented on the audience computers, should be electronically communicated in real-time. Accordingly, in some examples engine 400 may analyze at least a portion of metadata stored in method cache 414 to identify a broadcast program method that matches an invoked viewer program method (included in an indication of the viewer program method received from a viewer program as described above) within a lookup duration threshold. The lookup duration threshold may be specified in various manners, but generally such that real-time interaction between broadcaster and audience computers is preserved. For example, the lookup threshold duration may be specified as a time interval (e.g., 1 millisecond, 5 milliseconds, 16.6 milliseconds), such that when a corresponding broadcast program method is found within the time interval, a latency condition is satisfied that enables real-time interaction. In one example, the lookup duration threshold may be specified to satisfy a tick rate (e.g., 10 Hz, 15 Hz, 30 Hz, 60 Hz) according to which certain data is exchanged between broadcaster and audience computers.

Figure 5:
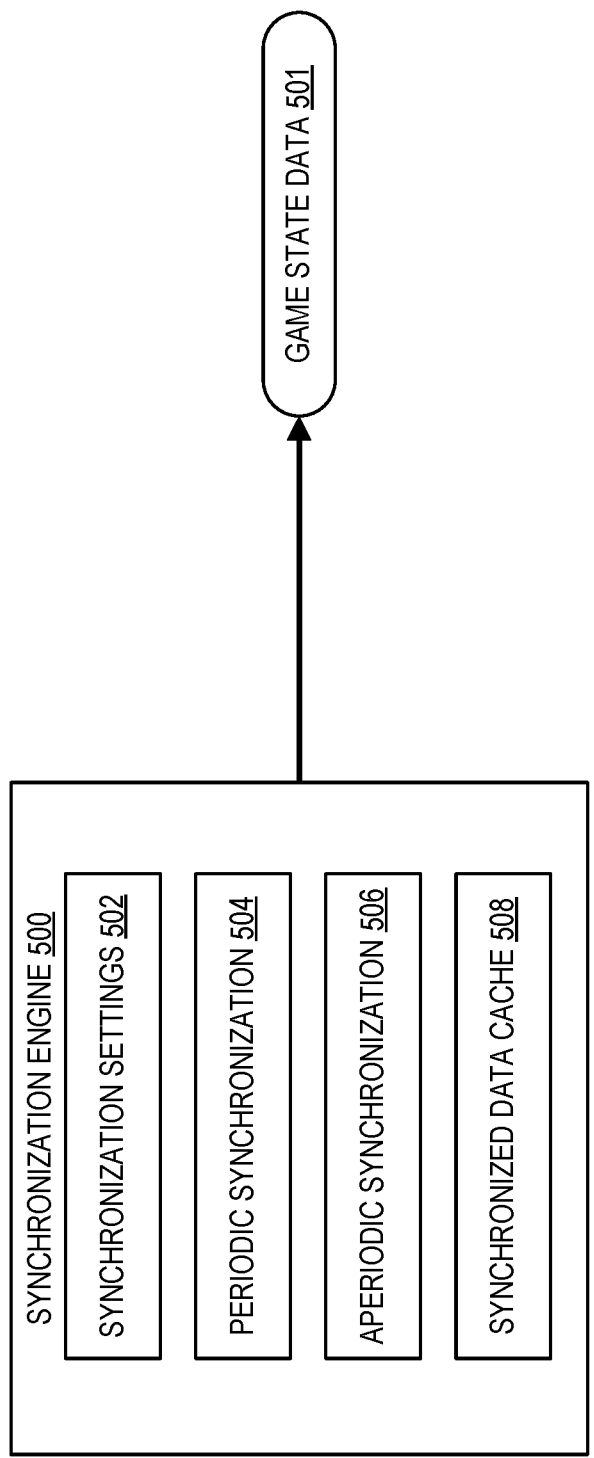
FIG. 5 is a schematic diagram depicting an example synchronization engine.

FIG. 5 is a schematic diagram depicting an example synchronization engine 500. Generally, engine 500 is configured to synchronize aspects of a broadcast program between a computing system on which the broadcast program is executed and a remote computing system with which remote participation in the broadcast program is conducted. Synchronization may occur at a relatively high frequency so that changes in the state of the broadcast program are reflected substantially in real-time at the remote computing system, enabling live participation in the broadcast program by the remote computing system. Engine 500 may be implemented in engine(s) 299 of FIGS. 2B-2E.

FIG. 5 illustrates state synchronization in the form of the selective transmission of game state data 501 (e.g., state data 249) from a computing system (e.g., broadcaster computer 110, source client system 210) executing a game program to a remote computing system (e.g., remote device 160, remote client system 270) participating in the game program. In other examples, state synchronization may occur between a broadcast program executing on a broadcaster computer and a viewer program executing on an audience computer.

Engine 500 may perform synchronization based on various synchronization settings 502. Settings 502 may stipulate a frequency/time interval at which a portion of game state data is synchronized, and/or a minimum threshold by which a portion of game state data changes before prompting its synchronization. In some examples, settings 502 may be specified for a game program on an entity or asset level. For example, in a football game program, a setting may be specified for a football stipulating a relatively high frequency at which the position of the football is synchronized, and a relatively low minimum threshold of change in the football position that prompts its synchronization. Another setting may be specified for a referee of the football game program specifying a relatively lower frequency at which the position of the referee is synchronized, and a relatively higher minimum threshold of change in the referee position that prompts its synchronization, due to the typically slower change in referee position compared to football position. As another example with reference to FIG. 1A, a relatively high synchronization frequency (e.g., 30 Hz, 60 Hz, 120 Hz) may be specified for the character positions represented in minimap 196 to enable their update substantially in real-time. These and other settings that may comprise settings 502 may be specified by a developer of a game program, for example.

As indicated at 504, engine 500 may perform periodic synchronization according to a regular frequency/time interval. Engine 500 may perform periodic synchronization for aspects of a game program that typically update on a regular basis, such as character position. Conversely as indicated at 506, engine 500 may perform aperiodic synchronization. Aperiodic synchronization may be conducted in response to a suitable trigger rather than at a regular frequency, and potentially for game program aspects that do not update regularly or in an unpredictable manner, and/or for which updates at a remote computing system are desired as immediately as possible. For example, engine 500 may aperiodically synchronize damage (e.g., a reduction in health) to a character with a remote computing system in response to being notified of such damage. The aspects (e.g., entities, assets) of a game program for which periodic and aperiodic synchronization are performed may be specified as part of settings 502, for example. In performing synchronization, engine 500 may cache a list of synchronized game state data (e.g., variables, parameters, fields) in a synchronized data cache 508. Cache 508 may be implemented as part of cache 308 and/or 414, or as a separate cache. In some examples, engine 500 may electronically cache a list of game state data synchronized between a broadcaster computer and an audience computer, where the game state data is one or both of periodically synchronized based on a periodic interval and aperiodically synchronized in response to a threshold change in the game state data, as described above.

As an example illustrating the operation of engine 500, a typical synchronization process executed by the engine may include first caching a list of synchronized fields via cache 308. Next, engine 500 may determine if a field should be synchronized with a remote computing system if a synchronization time interval specified for the field has expired. If the interval has expired, engine 500 may then determine if a change in the field is greater than or equal to a minimum threshold change specified for the field. If the change meets this condition, engine 500 may then serialize (e.g., via engine 300) input if possible. Alternatively or additionally, input may be formatted into a format specified by a game program developer (e.g., a JSON format) and transmitted as a string.

In view of the above, one or more of engines 300, 400, and 500 may leverage functionality provided by another of the engines, and a computing system may use one or more of the engines to provide an interactive game, broadcast, production, or other program or enable participation in the interactive game, broadcast, production, or other program. Moreover, portions of one or more of engines 300, 400, and 500 may be implemented in any suitable form, such as an API. For example, a collection of APIs implementing engines 300, 400, and 500 may be made accessible to a game program developer, thereby enabling the developer to provide cross-platform participation in the game program.

In many game development contexts, an editor program is used to develop a game program. Some editor programs include a GUI usable to build game program logic visually (e.g., by forming and connecting logic blocks with the GUI), which may complement or supplant a more traditional approach to building game program logic, in which game program logic is written as lines of code specific to a programming language via an integrated development environment (IDE), compiler, or other program. Such editor programs may enable artists and other members of a game development team lacking the technical expertise associated with a typical game programmer to build game program logic.

Various issues may be associated with employing an editor program configured to enable the visual construction of game program logic in conjunction with the cross-platform interactive experiences described herein. While the editor program may be configured to interface with a game program, and thereby be able to identify and call game program methods, the editor program may not be configured to interface with a media viewer program used by a remote computing system to participate in the game program. Further, methods specific to the media viewer program may not be in a format that can be interpreted by the editor program. Accordingly, media viewer program methods may be unavailable to the editor program. Programming knowledge thus may be required to design methods in the media viewer program that can interface with the game program and its game program methods, where delegating the design of front-end media viewer program functionality to artists and other non-programmers would otherwise be desired.

Figure 6:
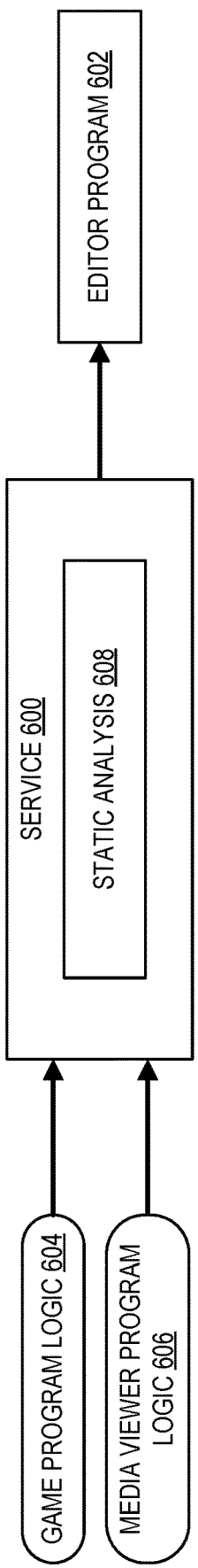
FIG. 6 schematically depicts an example service configured to make game program and media viewer program functionality available to an editor program.

To address these and other issues, a service may be used to query a game program and media viewer program and thereby make game program and media viewer program functionality available to an editor program. FIG. 6 schematically depicts an example service 600 configured to make game program and media viewer program functionality available to an editor program 602. Service 600 is configured to query a game program to receive game program logic 604, and to query a media viewer program configured to enable remote participation in the game program, to thereby receive media viewer program logic 606. Logic 604 and 606 may include methods, fields, state data, assets, and/or any other suitable information.

In one example, media viewer program methods written in JavaScript may be received as part of media viewer program logic 606. Custom attributes may be defined for the media viewer program methods (e.g., via decorating functionality in JavaScript) to describe the methods with metadata—e.g., a method can be marked in this way as being remotely callable. A static analysis module 608 may be used to perform static analysis and identify media viewer program methods via their associated metadata. Editor program 602 can then query service 600 for media viewer program methods, such as those that are remotely callable, which can then be represented and used to visually build logic— including media viewer program logic used to present front-end interactive controls selectable to participate in a game program, and game program logic used to affect game program state. As a specific example, a media viewer program method entitled "IncreaseSpeed( )" may be made available to editor program 602, such that the method can be logically linked to a corresponding game program method that effects the functionality intended to be carried out upon execution of the IncreaseSpeed( ) method (e.g., via an interactive control). In some examples, a game program method may be linked to the media viewer program without scripting in JavaScript or a similar language. Instead, the game program method may be linked via HTML or another markup language—for example, a <div> element may be defined in HTML in the following manner: <div data-click="IncreaseSpeed"> <div>, where IncreaseSpeed is a remote game program method (e.g., written in C++) that can be executed via interaction with the media viewer program. While described in the context of a game program, service 600 may be implemented for broadcast, production, and other types of programs and content.

Figure 7:
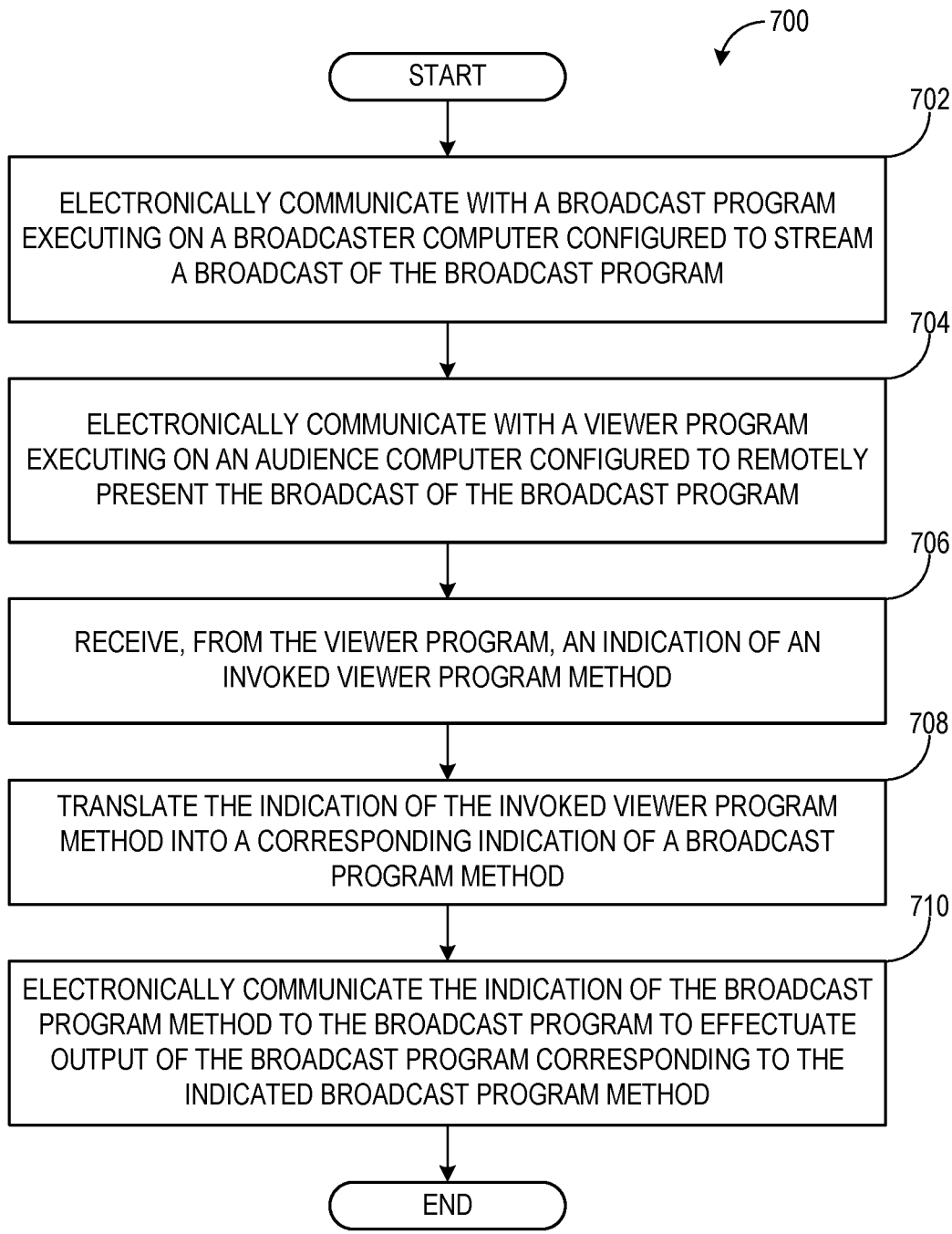
FIG. 7 shows a flowchart illustrating an example method of facilitating participation in an interactive broadcast.

FIG. 7 shows a flowchart illustrating an example method 800 of facilitating participation in an interactive broadcast. Method 800 may be executed on various systems illustrated in FIGS. 2A-2E, (e.g., using one or more of engines 300, 400, and 500). For example, method 800 may be implemented on one or more of source client system 210, server system 262, and remote client system 270.

At 702, method 700 includes electronically communicating with a broadcast program executing on a broadcaster computer configured to stream a broadcast of the broadcast program, the broadcast program supporting a set of broadcast program methods and not a set of viewer program methods. As examples, the broadcaster computer may be broadcaster computer 110, broadcaster computer 904, broadcasting computing device 110", or source client system 210. The broadcast program may be an operating system, a platform broadcasting program configured to broadcast a variety of different video game programs or other content, a video game program (e.g., broadcast program 248), a production program, etc. In some examples, electronically communicating with the broadcast program may include intra-device electronic communication between a streaming program and the broadcast program both executing on the broadcaster computer. In some examples, electronically communicating with the broadcast program may include a remote computing system electronically communicating with the broadcast program.

At 704, method 700 includes electronically communicating with a viewer program executing on an audience computer configured to remotely present the broadcast of the broadcast program, the viewer program supporting the set of viewer program methods and not the set of broadcast program methods. As examples, the audience computer may be remote device 160, audience computer 916, remote viewing device 160B, 160C, 160D, or remote client system 270. The viewer program may be viewer program 290, for example. In some examples, the viewer program may be presented on an Internet browser executing on the audience computer.

At 706, method 700 includes receiving, from the viewer program, an indication of an invoked viewer program method. The indication may be generated in response to user selection of an interactive control presented by the viewer program, for example.

At 708, method 700 includes translating the indication of the invoked viewer program method into a corresponding indication of a broadcast program method. In some examples, translation may be accompanied by other forms of processing applied to the indication of the invoked viewer program and/or other data. As examples, remote input, the indication of the invoked viewer program, mouse/touch/other coordinates, and/or state data of the broadcast program may be serialized and/or deserialized, and/or mapped from one datatype to another. In some examples, broadcast program methods and associated metadata may be cached for lookup within a lookup duration threshold. In some examples, at least some broadcast program methods may be marked as remotely callable. In some examples, a two-dimensional coordinate accompanying the indication of the invoked viewer program method may be mapped to a target within the broadcast program, in response to which state data of the broadcast program may be processed and sent to the viewer program. In some examples, data may be synchronized between the broadcast and viewer program, synchronously or asynchronously. In some examples, a list of synchronized data may be cached.

At 710, method 700 includes electronically communicating the indication of the broadcast program method to the broadcast program to effectuate output of the broadcast program corresponding to the indicated broadcast program method.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
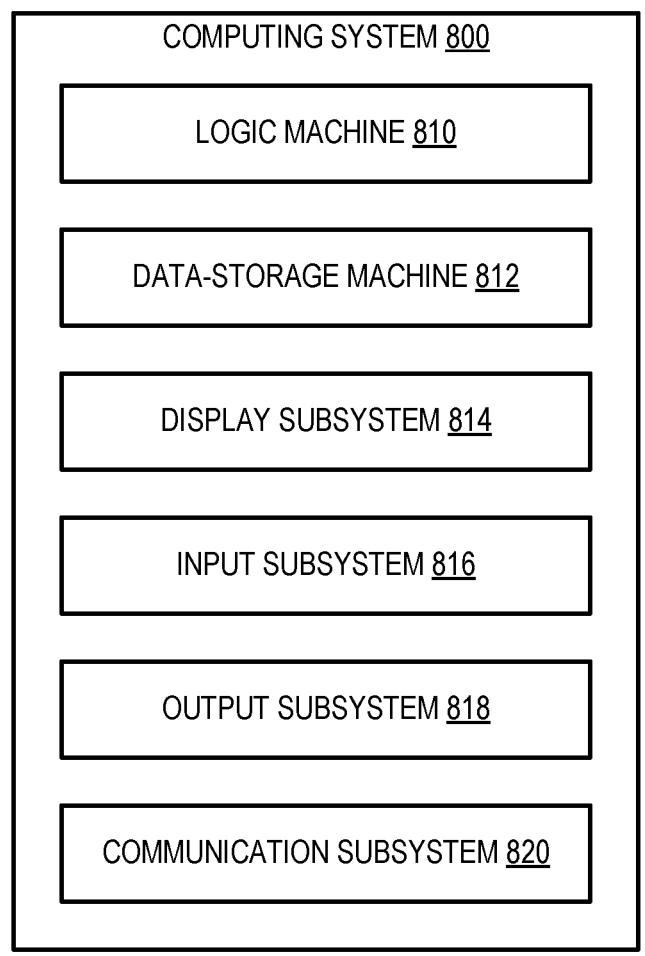
FIG. 8 schematically depicts an example computing system.

FIG. 8 schematically shows a non-limiting example of a computing system 800 that can enact one or more of the methods and processes described above. For example, computing system 800 may be representative of the various computing devices and/or computing platforms of FIGS. 2A-2E including source client system 210, remote client system 270, and server system 262. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 810 and a data-storage machine 812. Computing system 800 may optionally include a display subsystem 814 (e.g., an integrated or peripheral graphical display device), an input subsystem 816, an output subsystem 818, and a communication subsystem 820, and/or other components not shown in FIG. 7.

Logic machine 810 includes one or more physical devices configured to execute instructions. For example, logic machine 810 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 810 may include one or more processors configured to execute software instructions. Additionally or alternatively, logic machine 810 may include one or more hardware or firmware logic machines configured to execute hardware or firmware instructions. Processors of the logic machine may be single-core or multi-core, and the instructions executed thereon may be configured for sequential, parallel, and/or distributed processing. Individual components of logic machine 810 optionally may be distributed among two or more separate devices, which may be remotely located and/or configured for coordinated processing. Aspects of logic machine 810 may be virtualized and executed by remotely accessible, networked computing devices configured in a cloud-computing configuration.

Data-storage machine 812 includes one or more physical devices configured to hold instructions executable by logic machine 810 to implement the methods and processes described herein. When such methods and processes are implemented, the state of data-storage machine 812 may be transformed—e.g., to hold different data.

Data-storage machine 812 may include removable and/or built-in devices. Data-storage machine 812 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Data-storage machine 812 may include volatile, nonvolatile, dynamic, static, read/write, read-only, random-access, sequential-access, location-addressable, file-addressable, and/or content-addressable devices.

It will be appreciated that data-storage machine 812 includes one or more physical devices. However, aspects of the instructions described herein alternatively may be propagated by a communication medium (e.g., an electromagnetic signal, an optical signal, etc.) that is not held by a physical device for a finite duration. Furthermore, aspects of instructions described herein may reside on removable media devices.

Logic machine 810 and data-storage machine 812 may be collectively referred to as a computing platform, in some examples. Aspects of logic machine 810 and data-storage machine 812 may be integrated together into one or more hardware-logic components. Such hardware-logic components may include field-programmable gate arrays (FPGAs), program- and application-specific integrated circuits (PA- SIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 810 executing instructions held by data-storage machine 812. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices. As an example, a service hosted at server system 272 of FIGS. 2A-2E may facilitate streaming from source client system 210 to a population of many receiving client systems of which receiving client system 270 is an example.

When included, display subsystem 814 may be used to present a visual representation of data held by data-storage machine 812. This visual representation may take the form of a graphical user interface (GUI). As the herein described methods and processes change the data held by the storage machine, and thus transform the state of the storage machine, the state of display subsystem 814 may likewise be transformed to visually represent changes in the underlying data. Display subsystem 814 may include one or more graphical display devices utilizing virtually any type of technology. Such display devices may be combined with logic machine 810 and/or data-storage machine 812 in a shared enclosure (e.g., as depicted with reference to broadcaster computer 110 of FIG. 1A). In other example, such display devices may be peripheral display devices.

When included, input subsystem 816 may comprise or interface with one or more user-input devices such as a keyboard, mouse, touch screen, game controller, microphone, inertial sensor, etc. For example, a microphone of input subsystem 816 may be integrated with a computing platform containing logic machine 810 and data-storage machine 812 via a common enclosure, or the microphone may be a peripheral device that is separate from and interfaces with the computing platform via one or more wired or wireless communication links. A wireless microphone may provide a microphone audio stream to a computing device over a wireless communications link using a wireless protocol, such as Bluetooth, as a non-limiting example.

In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, output subsystem 818 may comprise or interface with one or more output devices such as an audio speaker, a haptic feedback device (e.g., a vibration motor), etc. For example, an audio speaker of output subsystem 818 may be integrated with a computing platform containing logic machine 810 and data-storage machine 812 via a common enclosure, or the audio speaker may be a peripheral device that is separate from and interfaces with the computing platform via one or more wired or wireless communication links.

When included, communication subsystem 820 may be configured to communicatively couple computing system 800 with one or more other computing devices. Network transceiver 259 of FIG. 2A is an example of communication subsystem 820. Communication subsystem may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 800 to send and/or receive messages to and/or from other devices via a network such as the Internet.

Another example provides a computing system comprising a logic machine and a storage machine holding instructions executable by the logic machine to electronically communicate with a game program executing on a broadcaster computer configured to stream a broadcast of the game program, the game program supporting a set of game program methods and not a set of viewer program methods, electronically communicate with a viewer program executing on an audience computer configured to remotely present the broadcast of the game program, the viewer program supporting the set of viewer program methods and not the set of game program methods, receive, from the viewer program, an indication of an invoked viewer program method, translate the indication of the invoked viewer program method into a corresponding indication of a game program method, and electronically communicate the indication of the game program method to the game program to effectuate output of the game program corresponding to the indicated game program method.

Another example provides a method comprising electronically communicating with a game program executing on a broadcaster computer configured to stream a broadcast of the game program, the game program supporting a set of game program methods and not a set of viewer program methods, electronically communicating with a viewer program executing on an audience computer configured to remotely present the broadcast of the game program, the viewer program supporting the set of viewer program methods and not the set of game program methods, electronically caching one or more game program methods and metadata associated with the one or more game program methods in a cache, receiving, from the viewer program, an indication of an invoked viewer program method, analyzing at least a portion of the metadata stored in the cache to identify a game program method that matches the invoked viewer program method within a lookup duration threshold, and electronically communicating an indication of the game program method to the game program to effectuate output of the game program corresponding to the indicated game program method. In such an example, the one or more game program methods may be electronically cached upon startup of the game program, and the method alternatively or additionally may comprise electronically caching an additional game program method loaded by the game program following startup of the game program. In such an example, the metadata may include a name of each of the one or more game program methods, and identifying the game program method that matches the invoked viewer program method may include comparing a name of the game program method to a name of the invoked viewer program method. In such an example, the metadata may include a number of parameters taken by each of the one or more game program methods, and identifying the game program method that matches the invoked viewer program method may include comparing a number of parameters taken by the game program method to a number of parameters taken by the invoked viewer program method. In such an example, the metadata may include one or more datatypes taken by each of the one or more game program methods, and identifying the game program method that matches the invoked viewer program method may include comparing one or more datatypes taken by the game program method to one or more datatypes taken by the invoked viewer program method. In such an example, the metadata may include one or more datatypes produced by the one or more game program methods, and identifying the game program method that matches the invoked viewer program method may include comparing one or more datatypes produced by the game program method to one or more datatypes produced by the invoked viewer program method. In such an example, the method alternatively or additionally may comprise electronically caching a list of game state data synchronized between the broadcaster computer and the audience computer, the game state data being one or both of periodically synchronized based on a periodic interval and aperiodically synchronized in response to a threshold change in the game state data.

Another example provides a method comprising electronically communicating with a broadcast program executing on a broadcaster computer configured to stream a broadcast of the broadcast program, the broadcast program supporting a set of broadcast program methods and not a set of viewer program methods, electronically communicating with a viewer program executing on an audience computer configured to remotely present the broadcast of the broadcast program, the viewer program supporting the set of viewer program methods and not the set of broadcast program methods, receiving, from the viewer program, an indication of an invoked viewer program method, translating the indication of the invoked viewer program method into a corresponding indication of a broadcast program method, and electronically communicating the indication of the broadcast program method to the broadcast program to effectuate output of the broadcast program corresponding to the indicated broadcast program method. In such an example, the broadcast program may be a video game program. In such an example, the broadcast program may be a production program. In such an example, electronically communicating with the broadcast program may include electronically communicating between a streaming program executing on the broadcaster computer and the broadcast program. In such an example, electronically communicating with the broadcast program may include electronically communicating between a remote computing system and the broadcast program. In such an example, the viewer program may be presented on an Internet browser executing on the audience computer. In such an example, the method alternatively or additionally may comprise acquiring unprocessed state data from the broadcast program, processing the unprocessed state data based on a configuration of the audience computer to form processed state data, and electronically communicating the processed state data to the viewer program. In such an example, the viewer program may include an interactive control configured according to the processed game state data. In such an example, one or both of the indication of the invoked viewer program method and the unprocessed game state data may be processed via one or both of serialization and deserialization. In such an example, one or both of the indication of the invoked viewer program method and the unprocessed game state data may be processed by identifying a least common denominator datatype utilized by the game program and the viewer program. In such an example, the indication of the invoked viewer program method may include a two-dimensional coordinate, and the method alternatively or additionally may comprise mapping the two-dimensional coordinate to a location in the broadcast program, identifying a target of the broadcast program at the location, and electronically communicating state data corresponding to the target to the viewer program. In such an example, the method alternatively or additionally may comprise blocking at least a portion of the set of broadcast program methods from being remotely called from the audience computer.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computing system, comprising:
  a logic machine; and
  a storage machine holding instructions executable by the logic machine to:
    electronically communicate with a game program executing on a broadcaster computer configured to stream a broadcast of the game program, the game program supporting a set of game program methods and not a set of viewer program methods;
    electronically communicate with a viewer program executing on an audience computer configured to remotely present the broadcast of the game program, the viewer program supporting the set of viewer program methods and not the set of game program methods;
    receive, from the viewer program, an indication of an invoked viewer program method;
    translate the indication of the invoked viewer program method into a corresponding indication of a game program method;
    electronically communicate the indication of the game program method to the game program to effectuate output of the game program corresponding to the indicated game program method; and
    translate the indication of the invoked viewer program method into a corresponding indication of a broad- cast program method supported by a broadcast program that is different from the game program.

2. A method, comprising:
electronically communicating with a game program executing on a broadcaster computer configured to stream a broadcast of the game program, the game program supporting a set of game program methods and not a set of viewer program methods;
electronically communicating with a viewer program executing on an audience computer configured to remotely present the broadcast of the game program, the viewer program supporting the set of viewer program methods and not the set of game program methods;
electronically caching one or more game program methods and metadata associated with the one or more game program methods in a cache;
receiving, from the viewer program, an indication of an invoked viewer program method;
analyzing at least a portion of the metadata stored in the cache to identify a game program method that matches the invoked viewer program method within a lookup duration threshold; and
electronically communicating an indication of the game program method to the game program to effectuate output of the game program corresponding to the indicated game program method.

3. The method of claim 2, wherein the one or more game program methods are electronically cached upon startup of the game program, the method further comprising electronically caching an additional game program method loaded by the game program following startup of the game program.

4. The method of claim 2, wherein the metadata includes a name of each of the one or more game program methods, and wherein identifying the game program method that matches the invoked viewer program method includes comparing a name of the game program method to a name of the invoked viewer program method.

5. The method of claim 2, wherein the metadata includes a number of parameters taken by each of the one or more game program methods, and wherein identifying the game program method that matches the invoked viewer program method includes comparing a number of parameters taken by the game program method to a number of parameters taken by the invoked viewer program method.

6. The method of claim 2, wherein the metadata includes one or more datatypes taken by each of the one or more game program methods, and wherein identifying the game program method that matches the invoked viewer program method includes comparing one or more datatypes taken by the game program method to one or more datatypes taken by the invoked viewer program method.

7. The method of claim 2, wherein the metadata includes one or more datatypes produced by the one or more game program methods, and wherein identifying the game program method that matches the invoked viewer program method includes comparing one or more datatypes produced by the game program method to one or more datatypes produced by the invoked viewer program method.

8. The method of claim 2, further comprising electronically caching a list of game state data synchronized between the broadcaster computer and the audience computer, the game state data being one or both of periodically synchronized based on a periodic interval and aperiodically synchronized in response to a threshold change in the game state data.

9. A method, comprising:
electronically communicating with a broadcast program executing on a broadcaster computer configured to stream a broadcast of the broadcast program, the broadcast program supporting a set of broadcast program methods and not a set of viewer program methods;
electronically communicating with a viewer program executing on an audience computer configured to remotely present the broadcast of the broadcast program, the viewer program supporting the set of viewer program methods and not the set of broadcast program methods;
receiving, from the viewer program, an indication of an invoked viewer program method;
translating the indication of the invoked viewer program method into a corresponding indication of a broadcast program method;
electronically communicating the indication of the broadcast program method to the broadcast program to effectuate output of the broadcast program corresponding to the indicated broadcast program method; and
translating the indication of the invoked viewer program method into a corresponding indication of a streamed program method supported by a streamed program that is different from the broadcast program.

10. The method of claim 9, wherein the broadcast program is a video game program.

11. The method of claim 9, wherein the broadcast program is a production program.

12. The method of claim 9, wherein electronically communicating with the broadcast program includes electronically communicating between a remote computing system and the broadcast program.

13. The method of claim 9, wherein the viewer program is presented on an Internet browser executing on the audience computer.

14. The method of claim 9, further comprising:
acquiring unprocessed state data from the broadcast program;
processing the unprocessed state data based on a configuration of the audience computer to form processed state data; and
electronically communicating the processed state data to the viewer program.

15. The method of claim 14, wherein the viewer program includes an interactive control configured according to the processed game state data.

16. The method of claim 14, wherein one or both of the indication of the invoked viewer program method and the unprocessed game state data are processed via one or both of serialization and deserialization.

17. The method of claim 14, wherein one or both of the indication of the invoked viewer program method and the unprocessed game state data are processed by identifying a least common denominator datatype utilized by the game program and the viewer program.

18. The method of claim 9, wherein the indication of the invoked viewer program method includes a two-dimensional coordinate, the method further comprising:
mapping the two-dimensional coordinate to a location in the broadcast program;
identifying a target of the broadcast program at the location; and
electronically communicating state data corresponding to the target to the viewer program.

19. The method of claim 9, further comprising blocking at least a portion of the set of broadcast program methods from being remotely called from the audience computer.

\* \* \* \* \*